(12) United States Patent
Ikai et al.

(10) Patent No.: US 10,778,976 B2
(45) Date of Patent: Sep. 15, 2020

(54) IMAGE DECODING APPARATUS AND IMAGE CODING APPARATUS

(71) Applicants: SHARP KABUSHIKI KAISHA, Sakai, Osaka (JP); FG Innovation Company Limited, Tuen Mun (HK)

(72) Inventors: Tomohiro Ikai, Sakai (JP); Tomoko Aono, Sakai (JP)

(73) Assignees: SHARP KABUSHIKI KAISHA, Sakai, Osaka (JP); FG Innovation Company Limited, Tuen Mun, New Territories (HK)

(*) Notice: Subject to any disclaimer, the term of this patent is extended or adjusted under 35 U.S.C. 154(b) by 0 days.

(21) Appl. No.: 16/336,242

(22) PCT Filed: Aug. 24, 2017

(86) PCT No.: PCT/JP2017/030409
§ 371 (c)(1),
(2) Date: Mar. 25, 2019

(87) PCT Pub. No.: WO2018/061550
PCT Pub. Date: Apr. 5, 2018

(65) Prior Publication Data
US 2019/0230355 A1   Jul. 25, 2019

(30) Foreign Application Priority Data

Sep. 28, 2016 (JP) ................... 2016-190356

(51) Int. Cl.
*H04N 19/119* (2014.01)
*H04N 19/50* (2014.01)
(Continued)

(52) U.S. Cl.
CPC ......... *H04N 19/119* (2014.11); *H04N 19/127* (2014.11); *H04N 19/157* (2014.11);
(Continued)

(58) Field of Classification Search
CPC .................................................... H04N 19/119
See application file for complete search history.

(56) References Cited

U.S. PATENT DOCUMENTS 9,621,905 B2 * 4/2017 Coban .................... H04N 19/70
9,900,624 B2 * 2/2018 Lai .......................... H04N 19/70
(Continued)

OTHER PUBLICATIONS

"Algorithm Description of Joint Exploration Test Model 3", Joint Video Exploration Team (JVET) of ITU-T SG 16 WP 3 and ISO/IEC JTC 1/SC 291WG 11, 3rd Meeting: Geneva, CH, May 26-Jun. 1, 2016.

*Primary Examiner* — Irfan Habib
(74) *Attorney, Agent, or Firm* — ScienBiziP, P.C.

(57) ABSTRACT

An image decoding apparatus (31) includes a CT information decoding unit (10) configured, in each coding tree, to decode a constraint flag indicating whether or not to constrain decoding a prediction unit, and a CU decoding unit (20) configured, in the coding tree, to decode a prediction unit in a coding node to be decoded first and to not decode a prediction unit in another coding node, in a case that the constraint flag indicates constraint of decoding the prediction unit. According to the present invention, it is possible to reduce a coding amount of PU and complexity of coding/decoding an image while maintaining a split with a high degree of freedom by CT split (QT split and BT split).

3 Claims, 37 Drawing Sheets

(51) Int. Cl.
*H04N 19/70* (2014.01)
*H04N 19/127* (2014.01)
*H04N 19/176* (2014.01)
*H04N 19/159* (2014.01)
*H04N 19/157* (2014.01)

(52) U.S. Cl.
CPC ......... *H04N 19/159* (2014.11); *H04N 19/176* (2014.11); *H04N 19/50* (2014.11); *H04N 19/70* (2014.11)

(56) References Cited

U.S. PATENT DOCUMENTS

| | | | | |
|---|---|---|---|---|
| 10,021,405 B2* | 7/2018 | Itoh | ...................... | H04N 19/186 |
| 10,075,720 B2* | 9/2018 | Tsukuba | ................. | H04N 19/44 |
| 10,356,432 B2* | 7/2019 | Seregin | ................. | H04N 19/70 |
| 10,477,204 B2* | 11/2019 | Misra | ................... | H04N 19/184 |
| 2011/0135000 A1* | 6/2011 | Alshina | ................ | H04N 19/119 |
| | | | | 375/240.13 |
| 2012/0230421 A1* | 9/2012 | Chen | .................... | H04N 19/176 |
| | | | | 375/240.18 |
| 2013/0034171 A1* | 2/2013 | Winken | ................. | H04N 19/46 |
| | | | | 375/240.25 |
| 2013/0202037 A1* | 8/2013 | Wang | ................... | H04N 19/577 |
| | | | | 375/240.15 |
| 2014/0016701 A1* | 1/2014 | Chen | .................... | H04N 19/105 |
| | | | | 375/240.14 |
| 2014/0092978 A1* | 4/2014 | Bugdayci | ............... | H04N 19/30 |
| | | | | 375/240.16 |
| 2014/0098880 A1* | 4/2014 | Seregin | ................ | H04N 19/517 |
| | | | | 375/240.16 |
| 2014/0247868 A1* | 9/2014 | Oh | ....................... | H04N 19/105 |
| | | | | 375/240.03 |
| 2014/0269908 A1* | 9/2014 | Oh | ....................... | H04N 19/119 |
| | | | | 375/240.03 |
| 2015/0341673 A1* | 11/2015 | Joshi | ..................... | H04N 19/93 |
| | | | | 375/240.12 |
| 2016/0234498 A1* | 8/2016 | Misra | ................... | H04N 19/593 |
| 2016/0323591 A1* | 11/2016 | Chuang | ............... | H04N 19/105 |
| 2018/0027246 A1* | 1/2018 | Liu | ....................... | H04N 19/70 |
| | | | | 375/240.02 |
| 2018/0077411 A1* | 3/2018 | Gisquet | ................ | H04N 19/70 |
| 2018/0091829 A1* | 3/2018 | Liu | ....................... | H04N 19/70 |
| 2019/0200020 A1* | 6/2019 | Lee | ...................... | H04N 19/105 |

* cited by examiner

FIG. 2A CODING VIDEO SEQUENCE 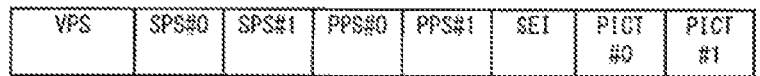
FIG. 2B CODING PICTURE 
FIG. 2C CODING SLICE 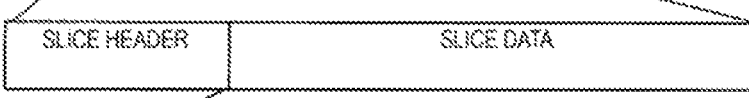
FIG. 2D CODING SLICE DATA 
FIG. 2E CODING TREE UNIT 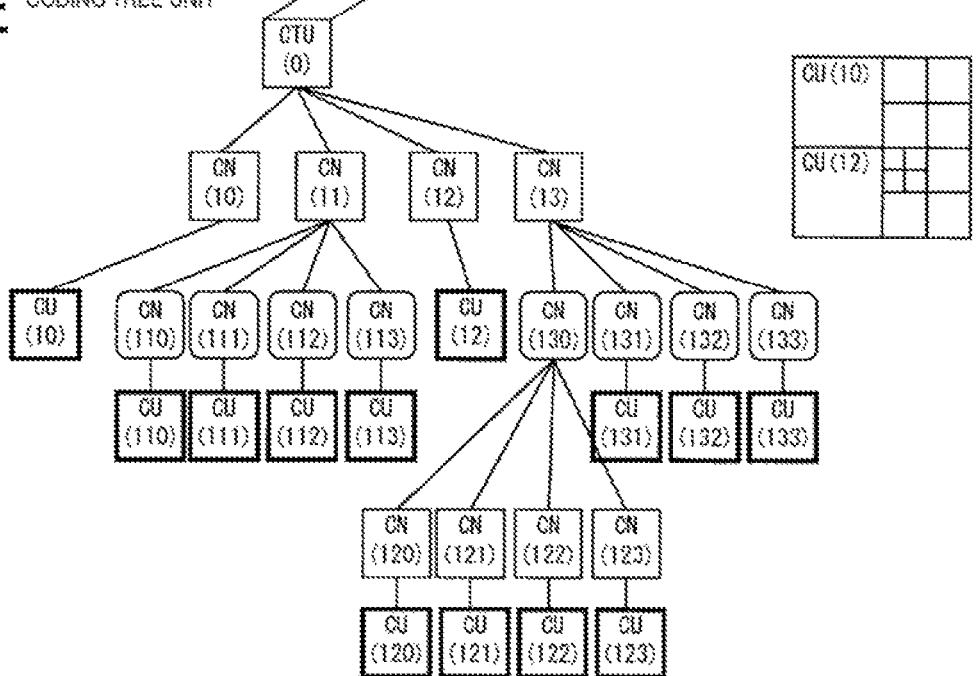
FIG. 2F CODING UNIT 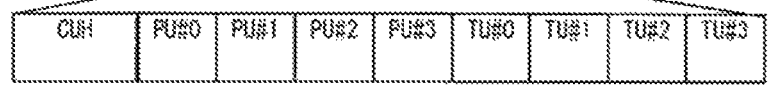

2Nx2N

2NxN

2NxnU

2NxnD

Nx2N nLx2N nRx2N

NxN

| | Descriptor |
|---|---|
| coding_quadtree( x0, y0, log2CbSize, cqtDepth ) { | |
| if( x0 + ( 1 << log2CbSize ) <= pic_width_in_luma_samples && y0 + ( 1 << log2CbSize ) <= pic_height_in_luma_samples && log2CbSize > MinCbLog2SizeY && (1<<log2CbSize) >= minQTSize ) | |
|    split_cu_flag[ x0 ][ y0 ] | ae(v) |
| if( log2CbSize >= log2MergedPUSize ) { | |
|    IsPuConstraint = 0 | |
| } | |
| if( split_cu_flag[ x0 ][ y0 ] ) { | |
|    if( ! IsPUConstraint ) { | |
|      pu_constraint_flag | |
|      if(pu_constraint_flag) { | |
|       IsPUCostraint = 1 | |
|       xMergedPU = x0, yMergedPU = y0 | |
|       log2MergedPUSize = log2CbSize (=log2CbWidth + log2CbHeight) | |
|      } | |
|    } | |
| x1 = x0 + ( 1 << ( log2CbSize − 1 ) ) | |
| y1 = y0 + ( 1 << ( log2CbSize − 1 ) ) | |
| coding_quadtree( x0, y0, log2CbSize − 1, cqtDepth + 1 ) | |
| if( x1 < pic_width_in_luma_samples ) | |
|    coding_quadtree( x1, y0, log2CbSize − 1, cqtDepth + 1 ) | |
| if( y1 < pic_height_in_luma_samples ) | |
|    coding_quadtree( x0, y1, log2CbSize − 1, cqtDepth + 1 ) | |
| if( x1 < pic_width_in_luma_samples && y1 < pic_height_in_luma_samples ) | |
|    coding_quadtree( x1, y1, log2CbSize − 1, cqtDepth + 1 ) | |
| } else | |
|    coding_binarytree(x0, y0, log2CbSize, log2CbSize, cqtDepth, 0 ) | |
| } | |

FIG. 13

| | Descriptor |
|---|---|
| coding_binarytree ( x0, y0, log2CbWidth, log2CbHeight, cqtDepth, cbtDepth ) { | |
|   if( ((1 << log2CbHeight) > minBTSize || (1 << log2CbWidth) > minBTSize ) && <br>     (1 << log2CbWidth) <= maxBTSize && <br>     (1 << log2CbHeight) <= maxBTSize && <br>     cbtDepth < maxBTDepth ) | |
|     split_bt_mode[ x0 ][ y0 ] | ae(v) |
|     if( (log2CbWidth+log2CbHeight) >= log2MergedPUSize ) { | |
|       IsPuConstraint = 0 | |
|     } | |
|   if ( split_bt_mode[ x0 ][ y0 ] !=0 ) { | |
|     if( ! IsPUConstraint ) { | |
|       pu_constraint_flag | |
|       if(pu_constraint_flag) { | |
|         IsPUConstraint = 1 | |
|         xMergedPU = x0, yMergedPU = y0 | |
|         log2MergedPUSize = log2CbWidth + log2CbHeight | |
|       } | |
|     } | |
|   } | |
|   if ( split_bt_mode[ x0 ][ y0 ] == 1 ) {/*VERTICAL SPLIT*/ | |
|     x1 = x0 + (1<< (log2CbWidth - 1 )) | |
|     coding_binarytree( x0, y0, log2CbWidth - 1, log2CbHeight, cqtDepth, cbtDepth + 1 ) | |
|     coding_binarytree( x1, y0, log2CbWidth - 1, log2CbHeight, cqtDepth, cbtDepth + 1 ) | |
|   } else if ( split_bt_mode[ x0 ][ y0 ] == 2 ) {/*HORIZONTAL SPLIT*/ | |
|     y1 = y0 + (1<< (log2CbHeight - 1)) | |
|     coding_binarytree( x0, y0, log2CbWidth, log2CbHeight - 1, cqtDepth, cbtDepth + 1 ) | |
|     coding_binarytree( x0, y1, log2CbWidth, log2CbHeight - 1, cqtDepth, cbtDepth + 1 ) | |
|   } else | |
|     coding_unit( x0, y0, log2CbWidth, log2CbHeight) | |
| } | |

FIG. 14

| coding_unit( x0, y0, log2CbWidth, log2CbHeight ) { | Descriptor |
|---|---|
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( !IsPUConstraint || (x0 == xMergedPU && y0 == yMergedPU) ) { | |
|       prediction_unit( x0, y0, log2CbWidth, log2CbHeight ) | |
|     } | |
|     transform_unit( x0, y0, log2CbWidth, log2CbHeight ) | |
|   } | |
| } | |

FIG. 16

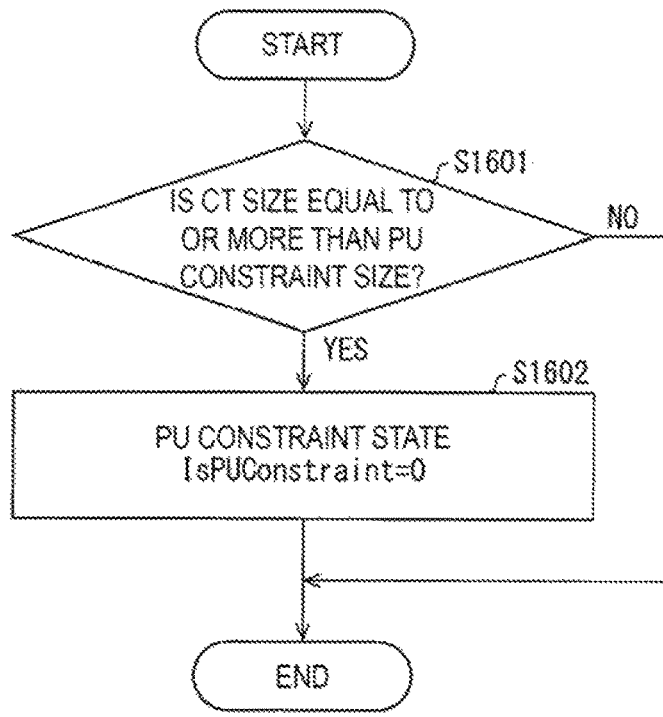

FIG. 17

| | Descriptor |
|---|---|
| coding_quadtree( x0, y0, log2CbSize, cqtDepth ) { | |
| if( x0 + ( 1 << log2CbSize ) <= pic_width_in_luma_samples && y0 + ( 1 << log2CbSize ) <= pic_height_in_luma_samples && log2CbSize > MinCbLog2SizeY && (1<<log2CbSize) >= minQTSize ) | |
| split_cu_flag[ x0 ][ y0 ] | ae(v) |
| if( cqtDepth <= MergedPUDepth ) { | |
|     IsPuConstraint = 0 | |
| } | |
| if( split_cu_flag[ x0 ][ y0 ] ) { | |
|     if( ! IsPUConstraint ) { | |
|       pu_constraint_flag | |
|       if(pu_constraint_flag) { | |
|         IsPUCostraint = 1 | |
|         xMergedPU = x0, yMergedPU = y0 | |
|         MergedPUDepth = cqtDepth | |
|       } | |
|     } | |
| x1 = x0 + ( 1 << ( log2CbSize − 1 ) ) | |
| y1 = y0 + ( 1 << ( log2CbSize − 1 ) ) | |
| coding_quadtree( x0, y0, log2CbSize − 1, cqtDepth + 1 ) | |
| if( x1 < pic_width_in_luma_samples ) | |
|   coding_quadtree( x1, y0, log2CbSize − 1, cqtDepth + 1 ) | |
| if( y1 < pic_height_in_luma_samples ) | |
|   coding_quadtree( x0, y1, log2CbSize − 1, cqtDepth + 1 ) | |
| if( x1 < pic_width_in_luma_samples && y1 < pic_height_in_luma_samples ) | |
|   coding_quadtree( x1, y1, log2CbSize − 1, cqtDepth + 1 ) | |
| } else | |
|   coding_binarytree(x0, y0, log2CbSize, log2CbSize, cqtDepth, 0 ) | |
| } | |

FIG. 19

| | Descriptor |
|---|---|
| coding_quadtree( x0, y0, log2CbSize, cqtDepth ) { | |
| if( x0 + ( 1 << log2CbSize ) <= pic_width_in_luma_samples && <br> y0 + ( 1 << log2CbSize ) <= pic_height_in_luma_samples && <br> log2CbSize > MinCbLog2SizeY && (1<<log2CbSize) >= <br> minQTSize ) | |
|    split_cu_flag[ x0 ][ y0 ] | ae(v) |
| if( cqtDepth <= MergedPUDepth ) { | |
|    IsPuConstraint = 0 | |
| } | |
| if( split_cu_flag[ x0 ][ y0 ] ) { | |
|    if( ! IsPUConstraint ) { | |
|      pu_constraint_flag | |
|      if(pu_constraint_flag) { | |
|        IsPUCostraint = 1 | |
|        xMergedPU = x0, yMergedPU = y0 | |
|        MergedPUDepth = cqtDepth | |
|      } | |
|    } | |
| x1 = x0 + ( 1 << ( log2CbSize − 1 ) ) | |
| y1 = y0 + ( 1 << ( log2CbSize − 1 ) ) | |
| coding_quadtree( x0, y0, log2CbSize − 1, cqtDepth + 1 ) | |
| if( x1 < pic_width_in_luma_samples ) | |
|    coding_quadtree( x1, y0, log2CbSize − 1, cqtDepth + 1 ) | |
| if( y1 < pic_height_in_luma_samples ) | |
|    coding_quadtree( x0, y1, log2CbSize − 1, cqtDepth + 1 ) | |
| if( x1 < pic_width_in_luma_samples && <br> y1 < pic_height_in_luma_samples ) | |
|    coding_quadtree( x1, y1, log2CbSize − 1, cqtDepth + 1 ) | |
| } else | |
|    coding_binarytree(x0, y0, log2CbSize, log2CbSize, cqtDepth, 0 <br> ) | |
| } | |

FIG. 20

| | Descriptor |
|---|---|
| coding_quadtree( x0, y0, log2CbSize, cqtDepth ) { | |
| if( x0 + ( 1 << log2CbSize ) <= pic_width_in_luma_samples && <br> y0 + ( 1 << log2CbSize ) <= pic_height_in_luma_samples && <br> log2CbSize > MinCbLog2SizeY && (1<<log2CbSize) >= <br> minQTSize ) | |
|    split_cu_flag[ x0 ][ y0 ] | ae(v) |
| if( log2CbSize >= THSize ) { | |
|    IsPuConstraint = 0 | |
| } | |
| if( split_cu_flag[ x0 ][ y0 ] ) { | |
|    if( ! IsPUConstraint ) { | |
|      pu_constraint_flag | |
|      if(pu_constraint_flag) { | |
|        IsPUCostraint = 1 | |
|        xMergedPU = x0, yMergedPU = y0 | |
|      } | |
|    } | |
| x1 = x0 + ( 1 << ( log2CbSize − 1 ) ) | |
| y1 = y0 + ( 1 << ( log2CbSize − 1 ) ) | |
| coding_quadtree( x0, y0, log2CbSize − 1, cqtDepth + 1 ) | |
| if( x1 < pic_width_in_luma_samples ) | |
|    coding_quadtree( x1, y0, log2CbSize − 1, cqtDepth + 1 ) | |
| if( y1 < pic_height_in_luma_samples ) | |
|    coding_quadtree( x0, y1, log2CbSize − 1, cqtDepth + 1 ) | |
| if( x1 < pic_width_in_luma_samples && <br> y1 < pic_height_in_luma_samples ) | |
|    coding_quadtree( x1, y1, log2CbSize − 1, cqtDepth + 1 ) | |
| } else | |
|    coding_binarytree(x0, y0, log2CbSize, log2CbSize, cqtDepth, 0 ) | |
| } | |

FIG. 22

| | Descriptor |
|---|---|
| coding_binarytree ( x0, y0, log2CbWidth, log2CbHeight, cqtDepth, cbtDepth ) { | |
|   if( ((1 << log2CbHeight) > minBTSize \|\| (1 << log2CbWidth) > minBTSize ) && <br>     (1 << log2CbWidth) <= maxBTSize && <br>     (1 << log2CbHeight) <= maxBTSize && <br>     cbtDepth < maxBTDepth ) | |
|     split_bt_mode[ x0 ][ y0 ] | ae(v) |
|     if( log2CbSize >= THSize ) { | |
|       IsPuConstraint = 0 | |
|     } | |
|   if( split_bt_mode[ x0 ][ y0 ] !=0 ) { | |
|     if( ! IsPUConstraint ) { | |
|       pu_constraint_flag | |
|       if(pu_constraint_flag) { | |
|         IsPUConstraint = 1 | |
|         xMergedPU = x0, yMergedPU = y0 | |
|       } | |
|     } | |
|   } | |
|   if( split_bt_mode[ x0 ][ y0 ] == 1 ) {/*VERTICAL SPLIT* | |
|     x1 = x0 + (1<< (log2CbWidth - 1 )) | |
|     coding_binarytree( x0, y0, log2CbWidth - 1, log2CbHeight, cqtDepth, cbtDepth + 1 ) | |
|     coding_binarytree( x1, y0, log2CbWidth - 1, log2CbHeight, cqtDepth, cbtDepth + 1 ) | |
|   } else if( split_bt_mode[ x0 ][ y0 ] == 2 ) {/*HORIZONTAL SPLIT* | |
|     y1 = y0 + (1<< (log2CbHeight - 1)) | |
|     coding_binarytree( x0, y0, log2CbWidth, log2CbHeight - 1, cqtDepth, cbtDepth + 1 ) | |
|     coding_binarytree( x0, y1, log2CbWidth, log2CbHeight - 1, cqtDepth, cbtDepth + 1 ) | |
|   } else | |
|     coding_unit( x0, y0, log2CbWidth, log2CbHeight) | |
| } | |

FIG. 23

| | Descriptor |
|---|---|
| coding_binarytree ( x0, y0, log2CbWidth, log2CbHeight, cqtDepth, cbtDepth ) { | |
| if( ((1 << log2CbHeight) > minBTSize || (1 << log2CbWidth) > minBTSize ) &&<br>    (1 << log2CbWidth) <= maxBTSize &&<br>    (1 << log2CbHeight) <= maxBTSize &&<br>    cbtDepth < maxBTDepth ) | |
| split_bt_mode[ x0 ][ y0 ] | ae(v) |
| if( split_bt_mode[ x0 ][ y0 ] == 1 ) {/*VERTICAL SPLIT* | |
| x1 = x0 + (1<< (log2CbWidth - 1 )) | |
| coding_binarytree( x0, y0, log2CbWidth - 1, log2CbHeight, cqtDepth, cbtDepth + 1 ) | |
| coding_binarytree( x1, y0, log2CbWidth - 1, log2CbHeight, cqtDepth, cbtDepth + 1 ) | |
| } else if( split_bt_mode[ x0 ][ y0 ] == 2 ) {/*HORIZONTAL SPLIT* | |
| y1 = y0 + (1<< (log2CbHeight - 1)) | |
| coding_binarytree( x0, y0, log2CbWidth, log2CbHeight - 1, cqtDepth, cbtDepth + 1 ) | |
| coding_binarytree( x0, y1, log2CbWidth, log2CbHeight - 1, cqtDepth, cbtDepth + 1 ) | |
| } else | |
| coding_unit( x0, y0, log2CbWidth, log2CbHeight) | |
| } | |

FIG. 25

| | Descriptor |
|---|---|
| coding_quadtree( x0, y0, log2CbSize, cqtDepth ) { | |
| if( x0 + ( 1 << log2CbSize ) <= pic_width_in_luma_samples && <br> y0 + ( 1 << log2CbSize ) <= pic_height_in_luma_samples && <br> log2CbSize > MinCbLog2SizeY && (1<<log2CbSize) >= minQTSize ) | |
|    split_cu_flag[ x0 ][ y0 ] | ae(v) |
| if( log2CbSize >= log2MergedPUSize ) { | |
|    IsPuConstraint = 0 | |
| } | |
| if( split_cu_flag[ x0 ][ y0 ] ) { | |
|    if( ! IsPUConstraint && log2CbSize >= Log2MinPUSize ) { | |
|      pu_constraint_flag | |
|      if(pu_constraint_flag) { | |
|        IsPUCostraint = 1 | |
|        xPU = x0, yPU = y0 | |
|        log2MergedPUSize = log2CbSize (=log2CbWidth + log2CbHeight) | |
|      } | |
|    } | |
| x1 = x0 + ( 1 << ( log2CbSize − 1 ) ) | |
| y1 = y0 + ( 1 << ( log2CbSize − 1 ) ) | |
| coding_quadtree( x0, y0, log2CbSize − 1, cqtDepth + 1 ) | |
| if( x1 < pic_width_in_luma_samples ) | |
|    coding_quadtree( x1, y0, log2CbSize − 1, cqtDepth + 1 ) | |
| if( y1 < pic_height_in_luma_samples ) | |
|    coding_quadtree( x0, y1, log2CbSize − 1, cqtDepth + 1 ) | |
| if( x1 < pic_width_in_luma_samples && <br> y1 < pic_height_in_luma_samples ) | |
|    coding_quadtree( x1, y1, log2CbSize − 1, cqtDepth + 1 ) | |
| } else | |
|    coding_binarytree(x0, y0, log2CbSize, log2CbSize, cqtDepth, 0 ) | |
| } | |

FIG. 27

| | Descriptor |
|---|---|
| coding_binarytree ( x0, y0, log2CbWidth, log2CbHeight, cqtDepth, cbtDepth ) { | |
| if( ((1 << log2CbHeight) > minBTSize || (1 << log2CbWidth) > minBTSize ) &&<br>  (1 << log2CbWidth) <= maxBTSize &&<br>  (1 << log2CbHeight) <= maxBTSize &&<br>  cbtDepth < maxBTDepth ) | |
|   split_bt_mode[ x0 ][ y0 ] | ae(v) |
|   if( (log2CbWidth+log2CbHeight) >= log2MergedPUSize ) { | |
|     IsPuConstraint = 0 | |
|   } | |
| if ( split_bt_mode[ x0 ][ y0 ] !=0 ) { | |
|   if( ! IsPUConstraint && log2CbWidth == log2CbHeight ) { | |
|     pu_constraint_flag | |
|     if(pu_constraint_flag) { | |
|      IsPUConstraint = 1 | |
|      xMergedPU = x0, yMergedPU = y0 | |
|      log2MergedPUSize =log2CbWidth + log2CbHeight | |
|     } | |
|   } | |
| } | |
| if ( split_bt_mode[ x0 ][ y0 ] == 1 ) {/*VERTICAL SPLIT*/ | |
|   x1 = x0 + (1<< (log2CbWidth - 1 )) | |
|   coding_binarytree( x0, y0, log2CbWidth - 1, log2CbHeight, cqtDepth, cbtDepth + 1 ) | |
|   coding_binarytree( x1, y0, log2CbWidth - 1, log2CbHeight, cqtDepth, cbtDepth + 1 ) | |
| } else if ( split_bt_mode[ x0 ][ y0 ] == 2 ) {/*HORIZONTAL SPLIT*/ | |
|   y1 = y0 + (1<< (log2CbHeight - 1)) | |
|   coding_binarytree( x0, y0, log2CbWidth, log2CbHeight - 1, cqtDepth, cbtDepth + 1 ) | |
|   coding_binarytree( x0, y1, log2CbWidth, log2CbHeight - 1, cqtDepth, cbtDepth + 1 ) | |
| } else | |
|   coding_unit( x0, y0, log2CbWidth, log2CbHeight) | |
| } | |

FIG. 30

| | Descriptor |
|---|---|
| coding_quadtree( x0, y0, log2CbSize, cqtDepth ) { | |
| if( x0 + ( 1 << log2CbSize ) <= pic_width_in_luma_samples && <br> y0 + ( 1 << log2CbSize ) <= pic_height_in_luma_samples && <br> log2CbSize > MinCbLog2SizeY && (1<<log2CbSize) >= <br> minQTSize ) | |
| split_cu_flag[ x0 ][ y0 ] | ae(v) |
| if( log2CbSize >= Log2MinPUSize ) { | |
|     IsPuConstraintFlagCoded = 0 | |
| } | |
| if( log2CbSize >= log2MergedPUSize ) { | |
|     IsPuConstraint = 0 | |
| } | |
| if( split_cu_flag[ x0 ][ y0 ] ) { | |
|     if( ! IsPUConstraint && !IsPUConstraintFlagCoded) { | |
|       pu_constraint_flag | |
|       if(pu_constraint_flag) { | |
|         IsPUCostraint = 1 | |
|         IsPUCostraintFlagCoded = 1 | |
|         xMergedPU = x0, yMergedPU = y0 | |
|         log2MergedPUSize = log2CbSize (=log2CbWidth + log2CbHeight) | |
|       } | |
|     } | |
| x1 = x0 + ( 1 << ( log2CbSize − 1 ) ) | |
| y1 = y0 + ( 1 << ( log2CbSize − 1 ) ) | |
| coding_quadtree( x0, y0, log2CbSize − 1, cqtDepth + 1 ) | |
| if( x1 < pic_width_in_luma_samples ) | |
|   coding_quadtree( x1, y0, log2CbSize − 1, cqtDepth + 1 ) | |
| if( y1 < pic_height_in_luma_samples ) | |
|   coding_quadtree( x0, y1, log2CbSize − 1, cqtDepth + 1 ) | |
| if( x1 < pic_width_in_luma_samples && <br> y1 < pic_height_in_luma_samples ) | |
|   coding_quadtree( x1, y1, log2CbSize − 1, cqtDepth + 1 ) | |
| } else | |
|   coding_binarytree(x0, y0, log2CbSize, log2CbSize, cqtDepth, 0 ) | |
| } | |

FIG. 33

| | Descriptor |
|---|---|
| coding_quadtree( x0, y0, log2CbSize, cqtDepth ) { | |
| if( x0 + ( 1 << log2CbSize ) <= pic_width_in_luma_samples &&<br>y0 + ( 1 << log2CbSize ) <= pic_height_in_luma_samples &&<br>log2CbSize > MinCbLog2SizeY && (1<<log2CbSize) >= minQTSize  ) | |
|    split_cu_flag[ x0 ][ y0 ] | ae(v) |
| if( log2CbSize (= log2CbWidth + log2CbHeight) >=<br>log2MergedPUSize ( = log2MergedPUWidth + log2MergedPUHeight)) { | |
|    IsPuConstraint = 0 | |
| } | |
| if( split_cu_flag[ x0 ][ y0 ] ) { | |
|    if( ! IsPUConstraint ) { | |
|      pu_constraint_flag | |
|      if(pu_constraint_flag) { | |
|        IsPUCostraint = 1 | |
|        xMergedPU = x0, yMergedPU = y0 | |
|        log2MergedPUWidth = log2CbWidth | |
|        log2MergedPUHeight = log2CbHeight | |
|      } | |
|    } | |
| x1 = x0 + ( 1 << ( log2CbSize − 1 ) ) | |
| y1 = y0 + ( 1 << ( log2CbSize − 1 ) ) | |
| coding_quadtree( x0, y0, log2CbSize − 1, cqtDepth + 1 ) | |
| if( x1 < pic_width_in_luma_samples ) | |
|    coding_quadtree( x1, y0, log2CbSize − 1, cqtDepth + 1 ) | |
| if( y1 < pic_height_in_luma_samples ) | |
|    coding_quadtree( x0, y1, log2CbSize − 1, cqtDepth + 1 ) | |
| if( x1 < pic_width_in_luma_samples &&<br>   y1 < pic_height_in_luma_samples ) | |
|    coding_quadtree( x1, y1, log2CbSize − 1, cqtDepth + 1 ) | |
| } else | |
|    coding_binarytree(x0, y0, log2CbSize, log2CbSize, cqtDepth, 0 ) | |
| } | |

FIG. 35

| | Descriptor |
|---|---|
| coding_binarytree ( x0, y0, log2CbWidth, log2CbHeight, cqtDepth, cbtDepth ) { | |
|   if ( ((1 << log2CbHeight) > minBTSize \|\| (1 << log2CbWidth) > minBTSize ) && <br>     (1 << log2CbWidth) <= maxBTSize && <br>     (1 << log2CbHeight) <= maxBTSize && <br>     cbtDepth < maxBTDepth ) | |
|     split_bt_mode[ x0 ][ y0 ] | ae(v) |
|     if( (log2CbWidth+log2CbHeight) >= <br> (log2MergedPUWidth+log2MergedPUHeight) ) { | |
|       IsPuConstraint = 0 | |
|     } | |
|   if( split_bt_mode[ x0 ][ y0 ] !=0 ) { | |
|     if( ! IsPUConstraint ) { | |
|       pu_constraint_flag | |
|       if(pu_constraint_flag) { | |
|         xMergedPU = x0, yMergedPU = y0 | |
|         IsPUConstraint = 1 | |
|         log2MergedPUWidth =log2CbWidth | |
|         log2MergedPUHeight = log2CbHeight | |
|       } | |
|     } | |
|   } | |
|   if( split_bt_mode[ x0 ][ y0 ] == 1 ) {/*VERTICAL SPLIT*/ | |
|     x1 = x0 + (1<< (log2CbWidth - 1 )) | |
|     coding_binarytree( x0, y0, log2CbWidth - 1, log2CbHeight, cqtDepth, cbtDepth + 1 ) | |
|     coding_binarytree( x1, y0, log2CbWidth - 1, log2CbHeight, cqtDepth, cbtDepth + 1 ) | |
|   } else if( split_bt_mode[ x0 ][ y0 ] == 2 ) {/*HORIZONTAL SPLIT*/ | |
|     y1 = y0 + (1<< (log2CbHeight - 1)) | |
|     coding_binarytree( x0, y0, log2CbWidth, log2CbHeight - 1, cqtDepth, cbtDepth + 1 ) | |
|     coding_binarytree( x0, y1, log2CbWidth, log2CbHeight - 1, cqtDepth, cbtDepth + 1 ) | |
|   } else | |
|     coding_unit( x0, y0, log2CbWidth, log2CbHeight) | |
| } | |

FIG. 36

| | Descriptor |
|---|---|
| coding_unit( x0, y0, log2CbWidth, log2CbHeight) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( !IsPUConstraint \|\| (x0 == xMergedPU && y0 == yMergedPU) ) { | |
|       prediction_unit( x0, y0, log2MergedPUWidth, log2MergedPUHeight ) | |
|     } | |
|     transform_unit( x0, y0, log2CbWidth, log2CbHeight ) | |
|   } | |
| } | |

FIG. 37

| coding_unit( x0, y0, log2CbWidth, log2CbHeight ) { | Descriptor |
|---|---|
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( IsPUConstraint && (x0 == xMergedPU && y0 == yMergedPU) ) { | |
|   prediction_unit( x0, y0, log2MergedPUWidth, log2MergedPUHeight ) | |
|     else if( !IsPUConstraint ) { | |
|       prediction_unit( x0, y0, log2CbWidth, log2CbHeight ) | |
|     } | |
|     transform_unit( x0, y0, log2CbWidth, log2CbHeight ) | |
|   } | |
| } | |

FIG. 38

IMAGE DECODING APPARATUS AND IMAGE CODING APPARATUS

TECHNICAL FIELD

Embodiments of the present invention relate to an image decoding apparatus and an image coding apparatus.

BACKGROUND ART

To efficiently transfer or record a video, an image coding apparatus configured to generate coded data by coding the video and an image decoding apparatus configured to generate a decoded image by decoding the coded data are used.

Examples of specific video coding scheme include schemes proposed in H. 264/AVC and High-Efficiency Video Coding (HEVC).

In such a video coding scheme, an image (picture) included in the video is managed by a layered structure including a slice obtained by splitting the image, a coding unit (which may be abbreviated as "CU (Coding Unit)") obtained by splitting the slice, a prediction unit (PU) that is a block obtained by splitting the coding unit, and a transform unit (TU), and is coded/decoded for each CU.

Furthermore, in such a video coding scheme, generally, a prediction image is generated based on a locally decoded image obtained by coding/decoding an input image, and a prediction residual (which may be referred to as "difference image" or "residual image") obtained by subtracting the prediction image from the input image (original image) is coded. A method of generating the prediction image includes an inter-screen prediction (inter prediction) and an intra-screen prediction (intra prediction).

Furthermore, an example of a recent video coding and decoding technology includes Non Patent Literature 1.

Furthermore, in recent years, as a method of splitting a Coding Tree Unit (CTU) included in the slice, in addition to QT split where the CTU is split in a quad tree fashion to obtain a CU, BT split where the CTU is split in a binary tree fashion to obtain a CU is introduced. The BT split includes a method of horizontally splitting the CTU and a method of vertically splitting the CTU.

CITATION LIST

Non Patent Literature

NPL 1: "Algorithm Description of Joint Exploration Test Model 3", JVET-C 1002, Joint Video Exploration Team (JVET) of ITU-T SG 16 WP 3 and ISO/IEC JTC 1/SC 29/WG 11, published on May 31, 2016

SUMMARY OF INVENTION

Technical Problem

In Non Patent Literature 1, as a method of splitting a CT, the BT split is introduced in addition to the QT split, and thus, the degree of freedom of splitting into the PU and TU obtained by splitting into the CU (CT split) is improved. However, because of the improvement in the degree of freedom of splitting into the CU, there occurs a problem that the PU is reduced in size and an amount of coding of the PU increases. From a viewpoint of the coding amount of the PU to be coded/decoded, it is desired to perform prediction using the PU having a large block while maintaining the degree of freedom of the CT split.

Therefore, the present invention has been achieved in view of the above problems, and an object thereof is to provide an image decoding apparatus and an image coding apparatus capable of reducing a coding amount of PU and complexity of coding/decoding an image while maintaining a split with a high degree of freedom in CT split (QT split and BT split).

Solution to Problem

To resolve the above-described problem, an image decoding apparatus according to an aspect of the present invention is an image decoding apparatus for decoding a picture for each coding tree. The apparatus includes a constraint flag decoding unit configured to decode, in the coding tree, a constraint flag indicating whether or not to constrain decoding a prediction unit, and a prediction-unit decoding unit configured, in the coding tree, to decode a prediction unit in a coding node to be decoded first and to not decode a prediction unit in another coding node, in a case that the constraint flag indicates constraint of decoding a prediction unit.

Furthermore, to resolve the above-described problem, an image coding apparatus according to an aspect of the present invention is an image coding apparatus for coding a picture for each coding tree. The apparatus includes a constraint flag coding unit configured to code, in the coding tree, a constraint flag indicating whether or not to constrain coding a prediction unit, and a prediction-unit coding unit configured, in the coding tree, to code a prediction unit in a coding node to be coded first and to not code a prediction unit in another coding node in a case that the constraint flag indicates constraint of coding a prediction unit.

Advantageous Effects of Invention

An aspect of the present invention provides an image decoding apparatus and an image coding apparatus capable of reducing a coding amount of PU and complexity of coding/decoding an image while maintaining a split with a high degree of freedom in CT split (QT split and BT split).

BRIEF DESCRIPTION OF DRAWINGS

FIGS. 2A to 2F are diagrams illustrating a layered structure of data of a coding stream according to one embodiment of the present invention.

FIG. 3A to FIG. 3H illustrate partition shapes where the PU split modes are 2N×2N, 2N×N, 2N×nU, 2N×nD, N×2N, nL×2N, nR×2N, and N×N, respectively.

FIG. 8A illustrates the transmission device mounted with the image coding apparatus, and FIG. 8B illustrates the reception device mounted with the image decoding apparatus.

FIG. 9A illustrates the recording device mounted with the image coding apparatus, and FIG. 9B illustrates the reproducing device mounted with the image decoding apparatus.

FIG. 13 shows a configuration of a syntax table of QT information according to one embodiment of the present invention.

FIG. 14 shows a configuration of a syntax table of BT information according to one embodiment of the present invention.

FIG. 16 shows a configuration of a syntax table of CU information according to one embodiment of the present invention.

FIG. 17 is a flowchart illustrating a procedure of initializing a PU constraint state by the CT information decoding unit according to one embodiment of the present invention.

FIG. 19 shows a configuration of a syntax table of QT information according to one embodiment of the present invention.

FIG. 20 shows a configuration of a syntax table of BT information according to one embodiment of the present invention.

FIG. 22 shows a configuration of a syntax table of QT information according to one embodiment of the present invention.

FIG. 23 shows a configuration of a syntax table of BT information according to one embodiment of the present invention.

FIG. 25 shows a configuration of a syntax table of BT information according to one embodiment of the present invention.

FIG. 27 shows a configuration of a syntax table of QT information according to one embodiment of the present invention.

FIG. 30 shows a configuration of a syntax table of QT information according to one embodiment of the present invention.

FIG. 33 shows a configuration of a syntax table of QT information according to one embodiment of the present invention.

FIG. 35 shows a configuration of a syntax table of QT information according to one embodiment of the present invention.

FIG. 36 shows a configuration of a syntax table of BT information according to one embodiment of the present invention.

FIG. 37 shows a configuration of a syntax table of CU information according to one embodiment of the present invention.

FIG. 38 shows a configuration of a syntax table of CU information according to one embodiment of the present invention.

DESCRIPTION OF EMBODIMENTS

First Embodiment

Hereinafter, embodiments of the present invention are described with reference to the drawings.

Figure 1:
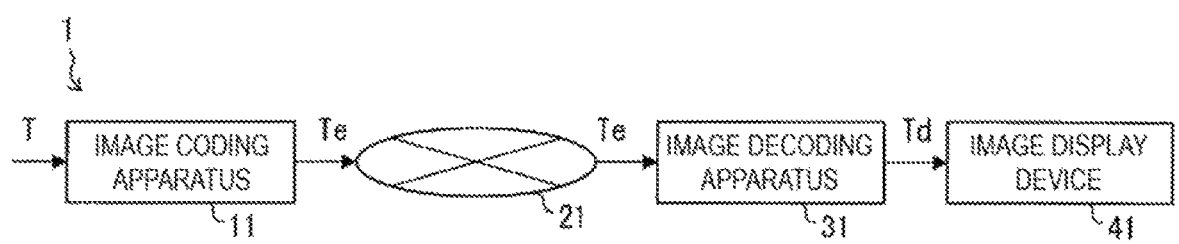
FIG. 1 is a schematic diagram illustrating a configuration of an image transmission system according to one embodiment of the present invention.

FIG. 1 is a schematic diagram illustrating a configuration of an image transmission system 1 according to the present embodiment.

The image transmission system 1 is a system configured to transmit a code obtained by coding an image to be coded, decode the transmitted code, and display the decoded image. The image transmission system 1 includes an image coding apparatus 11, a network 21, an image decoding apparatus 31, and an image display apparatus 41.

An image T representing an image having a single layer or multiple layers is input into the image coding apparatus 11. A layer is a concept used to make distinction among multiple pictures in a case that there are one or more pictures constituting a certain time interval. For example, in a case that the same pictures are coded with multiple layers different in picture quality or resolution, a scalable encoding ensues, and pictures different in viewpoint are coded with multiple layers, a view scalable coding ensues. In a case that prediction (interlayer prediction, interview prediction) is performed between pictures with multiple layers, coding efficiency is greatly improved. In a case that prediction is not performed (simulcast), the coded data can be collected.

The network 21 transmits a coding streams Te generated by the image coding apparatus 11 to the image decoding apparatus 31. The network 21 is the Internet, Wide Area Network (WAN), or Local Area Network (LAN), or a combination thereof. The network 21 is not necessarily limited to a bidirectional communication network, and may be a unidirectional communication network for transmitting a broadcast wave such as a terrestrial digital broadcasting and a satellite broadcasting. Furthermore, the network 21 may be replaced with a storage medium to record the coding stream Te such as Digital Versatile Disc (DVD) and Blue-ray Disc (BD).

The image decoding apparatus 31 decodes each of the coding streams Te transmitted by the network 21 to generate one or a multiple decoded images Td.

The image display apparatus 41 displays a whole or a part of the one or multiple of decoded images Td generated by the image decoding apparatus 31. The image display apparatus 41 includes a display device such as a liquid crystal display and an organic Electro-luminescence (EL) display. Furthermore, in spatial scalable coding, SNR scalable coding, in a case that the image decoding apparatus 31 and the image display apparatus 41 have a high processing capability, an extension layer image with a high image quality is displayed, and in a case that the image decoding apparatus 31 and the image display apparatus 41 have only a lower processing capability, a base layer image not requiring a high processing capability and display capability as in the extension layer is displayed.

Operator

An operator used herein is described below.

$>>$ is a right bit shift, $<<$ is a left bit shift, & is a bitwise AND, | is a bitwise OR, and |= is a sum operation (OR) with another condition.

x?y:z is a ternary operator where y is evaluated in a case that x is true (other than 0) and z is evaluated in a case that x is false (0).

Clip 3 (a, b, c) is a function where c is clipped to a or more and b or less, and in a case of c<a, a is evaluated, in a case of c>b, b is evaluated, and otherwise, c is evaluated (note a<=b).

Structure of Coding Stream Te

Before the image coding apparatus 11 and the image decoding apparatus 31 according to the present embodiment are described in detail, a data structure of the coding stream Te to be generated by the image coding apparatus 11 and decoded by the image decoding apparatus 31 will be described.

FIGS. 2A to 2F are diagrams illustrating a layered structure of data in a coding stream Te. For illustration, the coding stream Te includes a sequence and multiple pictures included in the sequence. FIGS. 2A to 2F illustrate a coding video sequence defining a sequence SEQ, a coding picture defining a picture PICT, a coding slice defining a slice S, coding slice data defining slice data, a coding tree unit included in the coding slice data, and a Coding Unit (CU) included in the coding tree unit, respectively.

Coding Video Sequence

In the coding video sequence, an aggregation of data to which the image decoding apparatus 31 refers to decode a sequence SEQ to be processed is defined. As illustrated in FIG. 2A, the sequence SEQ includes Video Parameter Set, Sequence Parameter Set (SPS), Picture Parameter Set (PPS), picture PICT, and Supplemental Enhancement Information (SEI). Here, a value indicated after # denotes a layer ID. FIGS. 2A to 2F illustrate an example where there are coded data of #0 and #1, that is, a layer 0 and a layer 1, but a type of layers and the number of layers are not limited thereto.

In the Video Parameter Set VPS, in a video including multiple layers, an aggregation of coding parameters common to multiple videos, and an aggregation of coding parameters associated with multiple layers included in the video and individual layers are defined.

In the Sequence Parameter Set SPS, an aggregation of coding parameters to which the image decoding apparatus 31 refers to decode a target sequence is defined. For example, a width or a height of the picture is defined. Note that there may be multiple SPSs. In that case, any SPS of the multiple SPSs is selected from the PPS.

In the Picture Parameter Set PPS, an aggregation of coding parameters to which the image decoding apparatus 31 refers to decode each picture in the target sequence is defined. The aggregation includes, for example, a reference value (pic_init_qp_minus26) of a quantization step size used for decoding the picture and a flag indicating application of a weighted prediction (weighted_pred_flag). Note that there may be multiple PPSs. In that case, any PPS of the multiple of PPSs is selected from each picture in the target sequence.

Coding Picture

In the coding picture, an aggregation of data to which the image decoding apparatus 31 refers to decode a picture PICT to be processed is defined. The picture PICT includes slices S0 to $S_{NS-1}$ (wherein NS is a total number of slices included in the picture PICT), as illustrated in FIG. 2B.

Note that a case that it is not necessary to distinguish each of the slices S0 to $S_{NS-1}$, a subscript to the symbol may be omitted below. Furthermore, the same applies to data included in the below-described coding stream Te, including another data with a subscript.

Coding Slice

In the coding slice, an aggregation of data to which the image decoding apparatus 31 refers to decode a slice S to be processed is defined. As illustrated in FIG. 2C, the slice S includes a slice header SH and slice data SDATA.

The slice header SH includes a coding parameter group to which the image decoding apparatus 31 refers to determine a method of decoding a target slice. Slice type designation information (slice_type) for designating a slice type is an example of the coding parameter included in the slice header SH.

The slice type that can be designated by the slice type designation information includes (1) I slice using only intra prediction during coding, (2) P slice using unidirectional prediction or intra prediction during coding, and (3) B slice using unidirectional prediction, bidirectional prediction, or intra prediction during coding.

Note that the slice header SH includes a reference to the Picture Parameter Set PPS included in the above-described coding video sequence (pic_parameter_set_id).

Coding Slice Data

In the coding slice data, an aggregation of data to which the image decoding apparatus 31 refers to decode a slice data SDATA to be processed is defined. The slice data SDATA includes a Coding Tree unit (CTU), as illustrated in FIG. 2D. The CTU is a block with a fixed size (for example, 64×64) included in the slice, and may be referred to as "Largest Coding Unit (LCU)".

Coding Tree Unit

As illustrated in FIG. 2E, an aggregation of data to which the image decoding apparatus 31 refers to decode a coding tree unit to be processed is defined. The coding tree unit is split into Coding Unit (CU) that is a basic unit of a coding process through recursive quad tree split (QT split) or binary tree split (BT split). A tree structure obtained by the recursive quad tree split or binary split referred to as "Coding Tree (CT)", and a node of the tree structure is referred to as "Coding Node (CN)". An intermediate node of the quad tree and the binary tree is a coding node, and the coding tree unit itself is defined as a top coding node.

The CTU includes a QT split flag (cu_split_flag) indicating whether to perform a QT split, and a BT split mode (split_bt_mode) indicating a split method of a BT split. The cu_split_flag and/or the split_bt_mode are transmitted for each coding node CN. In a case that the cu_split_flag is 1, the coding node CN is split into four coding nodes CNs. In a case that the cu_split_flag is 0, the coding node CN is not split. On the other hand, in a case that the split_bt_mode is 1, the coding node CN is horizontally split into two coding nodes CNs. In a case that the split_bt_mode is 2, the coding node CN is vertically split into two coding nodes CNs. In a case that the split_bt_mode is 0, the coding node CN is not split and one coding unit CU is retained as a node. The coding unit CU is a terminal node (leaf node) of the coding node, and is not split any farther.

Furthermore, in a case that a size of the coding tree unit CTU is 64×64 pixels, the size of the coding unit may be any one of: 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixel.

The CTU includes a PU constraint flag (pu_constraint_flag) indicating whether to constrain decoding of a PU in a target CT (whether to merge PU information in a target CT). The pu_constraint_flag is transmitted for each coding node CN. In a case that the pu_constraint_flag is 0, the decoding of the PU in the CT is not constrained, and in a case that the pu_constraint_flag is 1, the decoding of the PU in the CT is constrained. Note that an expression that the PU is constrained and an expression that the PU is merged carry the same meaning, and thus, "PU constraint" may be replaced with "PU merge", below. Furthermore, while a merge flag in a merge mode of the HEVC is a flag with an indication of copying a motion vector of an adjacent PU as a motion vector of a target PU (flag indicating that PU information other than the merge flag is not included in a target CT), the PU constraint flag (PU merge flag) of the present invention indicates whether one PU is made to represent one or more PUs in a target CT, and differs in configuration.

Coding Unit

As illustrated in FIG. 2F, an aggregation of data to which the image decoding apparatus 31 refers to decode a coding unit to be processed is defined. Specifically, the coding unit includes a prediction tree, a transform tree, and a CU header CUH. In the CU header, a prediction mode, a split method (PU split mode) and the like are defined.

In the prediction tree, prediction information (a reference picture index, a motion vector, and the like) of each prediction unit (PU) obtained by splitting the coding unit into one or multiple parts is defined. In other words, the prediction unit is one or multiple non-overlapping regions included in the coding unit. Furthermore, the prediction tree includes one or multiple prediction units obtained by the above-described split. Note that a unit of prediction obtained by further splitting the prediction unit is referred to as "sub block", below. The sub block includes multiple pixels. In a case that the prediction unit and the sub block are the same in size, the prediction unit has a single sub block. In a case that the prediction unit is larger in size than the sub block, the prediction unit is split into the sub block. For example, in a case that the prediction unit is 8×8 and the sub block is 4×4, the prediction unit is split into four sub blocks including two horizontally split parts and two vertically split parts.

A prediction process may be performed for each prediction unit (sub block).

Roughly speaking, the split in the prediction tree has two types including the intra prediction and the inter prediction. The intra prediction is a prediction within the same pictures, and the inter prediction means a prediction process performed between pictures different from each other (for example, between display times and between layer images).

In the case of the intra prediction, the split method includes 2N×2N (the same size as the coding unit) and N×N.

Furthermore, in the case of the inter prediction, the split method includes 2N×2N (the same size as the coding unit), 2N×N, 2N×nU, 2N×nD, N×2N, nL×2N, nR×2N, and N×N with coding being performed based on the PU split mode (part_mode) of the coded data. Note that 2N×N and N×2N indicate symmetrical split of 1:1, and 2N×nU, 2N×nD, and nL×2N, nR×2N indicate an asymmetrical split of 1:3, and 3:1. The PUs included in the CU are expressed in order of PU0, PU1, PU2, and PU3.

Figure 3A:
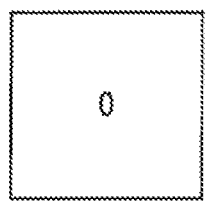
FIGS. 3A to 3H are diagrams illustrating a pattern of a PU split mode, where
Figure 3B:
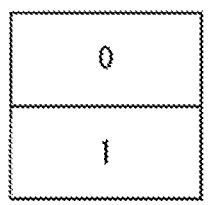
Figure 3C:
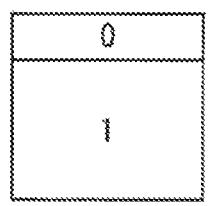
Figure 3D:
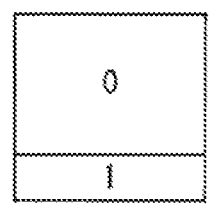
Figure 3E:
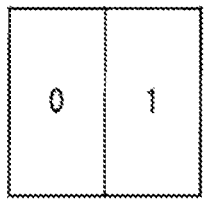
Figure 3F:
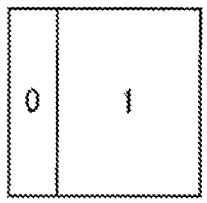
Figure 3G:
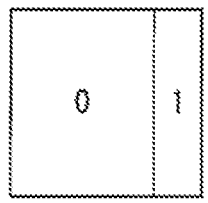
Figure 3H:
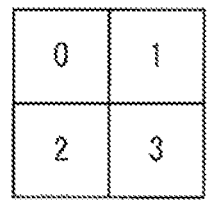

FIGS. 3A to 3H specifically illustrate the shape of the partition (the position of the boundary in PU split) in each of the PU split modes. FIG. 3A illustrates a partition of 2N×2N, and FIG. 3B, FIG. 3C, and FIG. 3D illustrate partitions (horizontally extended partitions) of 2N×N, 2N×nU, and 2N×nD, respectively. FIG. 3E, FIG. 3F, and FIG. 3G illustrate partitions (vertically extended partitions) of N×2N, nL×2N, and nR×2N, respectively, and FIG. 3H illustrates a partition of N×N. Note that the horizontally extended partition and the vertically extended partition are collectively referred to as "rectangular partition", and 2N×2N and N×N are collectively referred to as "square partition".

Furthermore, in the transform tree, the coding unit is split into one or multiple transform units, and a position and a size of each transform unit are defined. In other words, the transform unit is one or multiple non-overlapping regions included in the coding unit. Furthermore, the transform tree includes one or multiple transform units obtained by the above-described split.

The split in the transform tree includes a split where a region of the same size as the coding unit is assigned as the transform unit, and a split, similarly to the above-described CU split, realized by a recursive quad tree split. The transform unit is performed for each of the transform units.

Prediction Parameter

A prediction image of the Prediction Unit (PU) is derived by a prediction parameter accompanying the PU. The prediction parameter includes a prediction parameter for an intra prediction and a prediction parameter for an inter prediction. The prediction parameter of the inter prediction (inter prediction parameter) will be described below. The inter prediction parameter includes a prediction list utilization flags predFlagL0 and predFlagL1, a reference picture indexes refIdxL0 and refIdxL1, and a motion vectors mvL0 and mvL1. The prediction list utilization flags predFlagL0 and predFlagL1 are flags indicating whether reference picture lists respectively called L0 list and L1 list are employed, where in a case that a value is 1, a corresponding reference picture list is employed. Note that "flag indicating whether XX is true" used herein, in a case of the flag being other than 0 (for example, 1), indicates that XX is true, in a case of the flag being 0, indicates that XX is false. In a logical negation, a logical AND, and the like, it is regarded that 1 is true and 0 is false (hereinafter, the same applies). Note that in an actual device or method, another value may be used for true and false values.

Syntax elements for deriving the inter prediction parameter included in the coded data include a PU split mode part_mode, a merge flag merge_flag, a merge index merge_idx, an inter prediction identifier inter_pred_idc, a reference picture index refIdxLX, a prediction vector index mvp_LX_idx, and a difference vector mvdLX, for example.

Reference Picture List

Figure 4A:
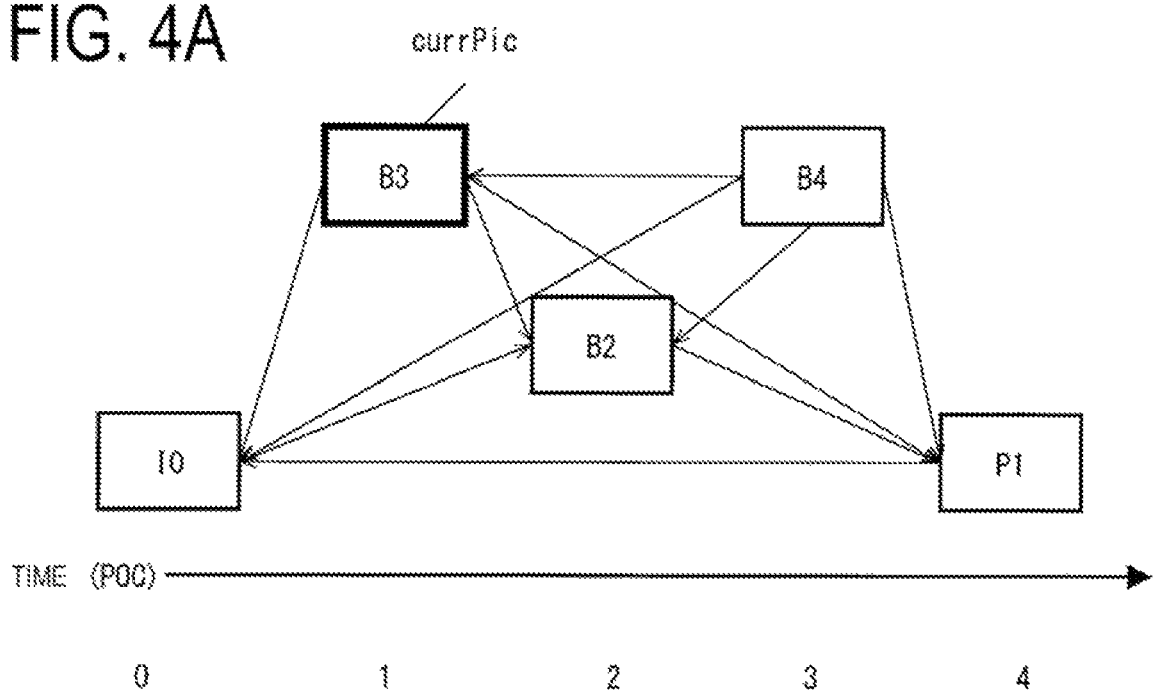
FIGS. 4A and 4B are conceptual diagrams illustrating an example of a reference picture and a reference picture list.
Figure 4B:
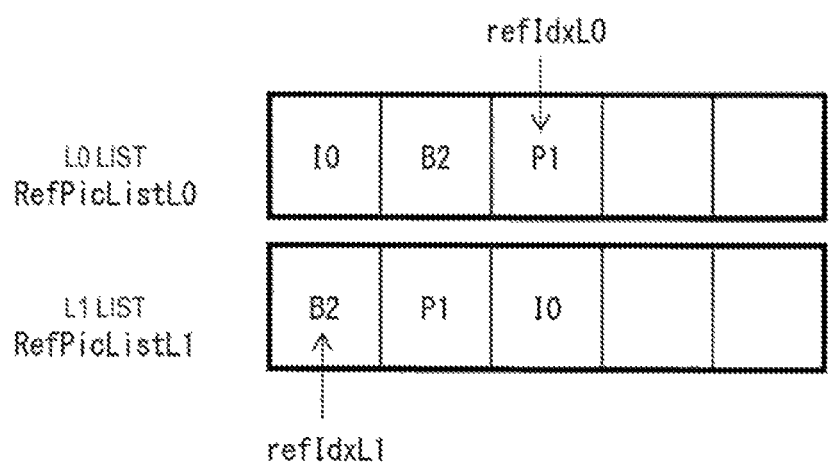

The reference picture list is a list including reference pictures stored in a reference picture memory 306. FIGS. 4A and 4B are conceptual diagrams illustrating an example of the reference picture and the reference picture list. In FIG. 4A, a rectangle indicates a picture, an arrow indicates a reference relationship between pictures, a horizontal axis is a time, I, P, and B in the rectangle indicate an intra picture, a uni-prediction picture, and a bi-prediction picture, respectively, and a number in the rectangle indicates a decoding order. As illustrated in the figures, the decoding order of the picture is I0, P1, B2, B3, and B4, and a display order is I0, B3, B2, B4, and P1. FIG. 4B illustrates an example of the reference picture list. The reference picture list is a list representing a candidate of the reference picture, where one picture (slice) may include one or more reference picture lists. In the illustrated example, a current picture B3 includes two reference picture lists, that is, a L0 list RefPicList0 and an L1 list RefPicList1. The reference pictures in a case of the current picture being B3 are I0, P1, and B2, and the reference pictures include these pictures as an element. In the individual prediction units, which picture in the reference picture list RefPicListX is actually referred is designated by a reference picture index refIdxLX. In the figures, an example is illustrated where the reference pictures P1 and B2 are designated by refIdxL0 and refIdxL1 to be referred.

Merge Prediction and AMVP Prediction

A method of decoding (coding) the prediction parameter includes a merge prediction (merge) mode and an Adaptive Motion Vector Prediction (AMVP) mode, and the merge flag merge_flag is a flag for distinguishing the two modes. The merge prediction mode is a mode employing deriving from a prediction parameter of an already processed adjacent PU while not including a prediction list utilization flag predFlagLX (or the inter prediction identifier inter_pred_idc), the reference picture index refIdxLX, and the motion vector mvLX, into the coded data, and the AMVP mode is a mode where the inter prediction identifier inter_pred_idc, the reference picture index refIdxLX, and the motion vector mvLX are included into the coded data. Note that the motion vector mvLX is coded as the prediction vector index mvp_LX_idx to distinguish a prediction vector mvpLX and the difference vector mvdLX.

The inter prediction identifier inter_pred_ide is a value indicating types and the number of reference pictures, and takes any one of PRED_L0, PRED_L1, and PRED_BI. PRED_L0 and PRED_L1 indicates that the reference picture managed by the L0 list and the L1 list respectively being the reference picture list is used, and indicates the one reference picture is used (uni-prediction). PRED_BI indicates that two reference pictures are used (bi-prediction BiPred), and uses the reference pictures managed by the L0 list and the L1 list. The prediction vector index mvp_LX_idx is an index indicating a prediction vector, and the reference picture index refIdxLX is an index indicating a reference picture managed by the reference picture list. Note that LX is a description method used in a case that the L0 prediction and the L1 prediction are not distinguished, and in a case that LX is replaced with L0 and L1, a parameter for the L0 list and a parameter for the L1 list are distinguished.

The merge index merge_idx is an index indicating which prediction parameter, out of candidate prediction parameters (merge candidates) derived from a PU where the process is completed, is used for a prediction parameter for a PU to be decoded.

Motion Vector

The motion vector mvLX indicates an amount of deviation between blocks on two different pictures. The prediction vector regarding the motion vector mvLX, and the difference vector regarding the same are referred to as "prediction vector mvpLX" and "difference vector mvdLX", respectively.

Inter prediction Identifier inter_pred_idc and Prediction List Utilization Flag predFlagLX A relationship between the inter prediction identifier inter_pred_ide and the prediction list utilization flags predFlagL0 and predFlagL1 is as follows, and can be replaced with each other.

inter_pred_idc=(predFlag$L$1<<1)+predFlag$L$0 predFlag$L$0=inter_pred_idc & 1 predFlag$L$1=inter_pred_idc>>1

Note that the prediction list utilization flag or the inter prediction identifier may be employed for the inter prediction parameter. Furthermore, a determination where the prediction list utilization flag is employed may be replaced with a determination where the inter prediction identifier is employed. On the other hand, a determination where the inter prediction identifier is employed may be replaced with a determination where the prediction list utilization flag is employed.

Determination of Bi-prediction biPred

A flag biPred indicating a determination for the bi-prediction biPred can be derived depending on whether the two prediction list utilization flags are both 1. For example, the following equation may be used for derivation.

biPred=(predFlag$L$0==1 && predFlag$L$1==1)

The flag biPred can be also derived depending on whether the inter prediction identifier is a value indicating that the two prediction lists (reference pictures) are used.

For example, the following equation may be used for derivation.

biPred=(inter_pred_idc==PRED_BI)?1:0

The above equation may be expressed with the following equation.

biPred=(inter_pred_idc==PRED_BI)

Note that as PRED_BI, a value of 3 may be used, for example.

Configuration of Image Decoding Apparatus

Figure 5:
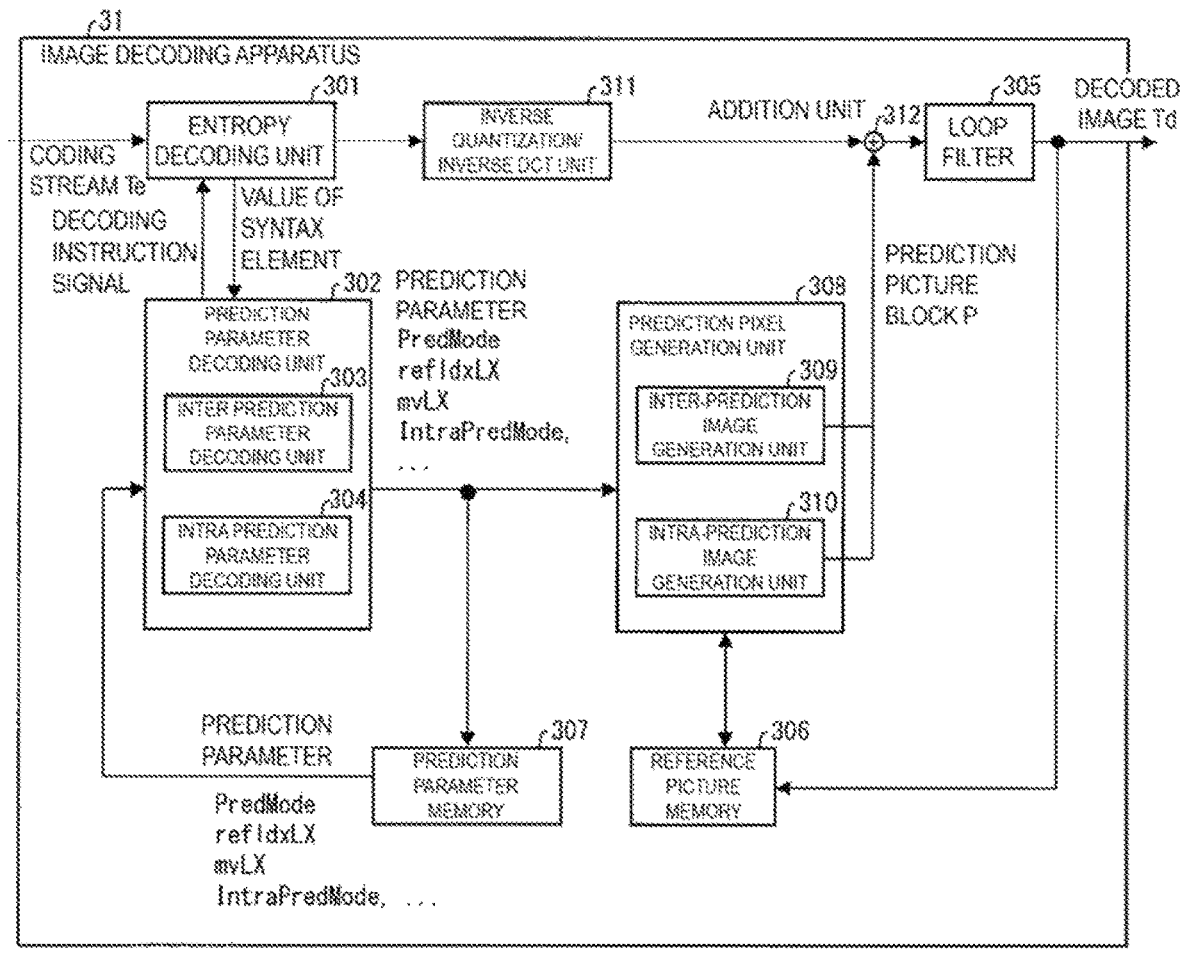
FIG. 5 is a block diagram illustrating a configuration of an image coding apparatus according to one embodiment of the present invention.

Next, a configuration of the image decoding apparatus 31 according to the present embodiment will be described. FIG. 5 is a schematic diagram illustrating the configuration of the image decoding apparatus 31 according to the present embodiment. The image decoding apparatus 31 includes an entropy decoding unit 301, a prediction parameter decoding unit (prediction image decoding device) 302, a loop filter 305, a reference picture memory 306, a prediction parameter memory 307, a prediction image generation unit (prediction image generation device) 308, an inverse quantization/inverse DCT unit 311, and an addition unit 312.

Furthermore, the prediction parameter decoding unit 302 includes an inter prediction parameter decoding unit 303 and an intra prediction parameter decoding unit 304. The prediction image generation unit 308 includes an inter-prediction image generation unit 309 and an intra-prediction image generation unit 310.

The entropy decoding unit 301 performs an entropy decoding on a coding stream Te input from outside to separate and decode each of the codes (syntax element). The separated code include prediction information for generating the prediction image and reside information for generating a difference image.

The entropy decoding unit 301 outputs some of the separated codes to the prediction parameter decoding unit 302. Some of the separated codes include a prediction mode predMode, a PU split mode part_mode, a merge flag merge_flag, a merge index merge_idx, an inter prediction identifier inter_pred_idc, a reference picture index refIdxLX, a prediction vector index mvp_LX_idx, and a difference vector mvdLX, for example. Control of decoding which code is performed based on an instruction of the prediction parameter decoding unit 302. The entropy decoding unit 301 outputs a quantization coefficient to the inverse quantization/inverse DCT unit 311. The quantization coefficient is a coefficient obtained by performing Discrete Cosine Transform (DCT) on the residual signal for quantization, in the coding process.

The inter prediction parameter decoding unit 303 refers to the prediction parameter stored in the prediction parameter memory 307, based on the code input from the entropy decoding unit 301, to decode the inter prediction parameter.

The inter prediction parameter decoding unit 303 outputs the decoded inter prediction parameter to the prediction image generation unit 308 or stores the same in the prediction parameter memory 307. The inter prediction parameter decoding unit 303 will be described in detail, later.

The intra prediction parameter decoding unit 304 refers to the prediction parameter stored in the prediction parameter memory 307, based on the code input from the entropy decoding unit 301, to decode the intra prediction parameter. The intra prediction parameter is a parameter used for a process of predicting a CU in one picture, for example, an intra prediction mode IntraPreMode. The intra prediction parameter decoding unit 304 outputs the decoded intra prediction parameter to the prediction image generation unit 308 or stores the same in the prediction parameter memory 307.

The intra prediction parameter decoding unit 304 may derive an intra prediction mode different between a luminance and a chrominance. In this case, the intra prediction parameter decoding unit 304 decodes, as a prediction parameter for a luminance, a luminance prediction mode IntraPredModeY, and as a prediction parameter for a chrominance, a chrominance prediction mode IntraPredModeC. The luminance prediction mode IntraPredModeY includes 35 modes including a planar prediction (0), a DC prediction (1), and a direction prediction (2 to 34). The chrominance prediction mode IntraPredModeC uses any of the planar prediction (0), the DC prediction (1), the direction prediction (2 to 34), and an LM mode (35). The intra prediction parameter decoding unit 304 decodes a flag indicating whether IntraPredModeC is the same mode as the luminance mode, upon indication that the flag is the same mode as the luminance mode, sets IntraPredModeY to intraPredModeC, and upon indication that the flag is a different mode from the luminance mode, as IntraPredModeC, may decode the planar prediction (0), the DC prediction (1), the direction prediction (2 to 34), and the LM mode (35).

The loop filter 305 provides a filter such as a deblocking filter, a sample adaptive offset (SAO), and an adaptive loop filter (ALF), on the decoded image of the CU generated by the addition unit 312.

The reference picture memory 306 stores the decoded image of the CU generated by the addition unit 312, at a previously defined position for each picture and each CU to be decoded.

The prediction parameter memory 307 stores the prediction parameter at a previously defined position for each picture and for each prediction unit (or for each sub block, fixed size block, and pixel) to be decoded. Specifically, the prediction parameter memory 307 stores the inter prediction parameter decoded by the inter prediction parameter decoding unit 303, the intra prediction parameter decoded by the intra prediction parameter decoding unit 304, and the prediction mode predMode separated by the entropy decoding unit 301. Examples of the inter prediction parameter to be stored include the prediction list utilization flag predFlagLX (inter prediction identifier inter_pred_idc), the reference picture index refIdxLX, and the motion vector mvLX.

The prediction mode predMode input from the entropy decoding unit 301 is input to the prediction image generation unit 308, and the prediction parameter from the prediction parameter decoding unit 302 is input. Furthermore, the prediction image generation unit 308 reads the reference picture from the reference picture memory 306. In the prediction mode indicated by the prediction mode predMode, the prediction image generation unit 308 uses the input prediction parameter and the read reference picture to generate the prediction image of the PU.

Here, in a case that the prediction mode predMode indicates the inter prediction mode, the inter-prediction image generation unit 309 uses the inter prediction parameter input from the inter prediction parameter decoding unit 303 and the read reference picture to generate the prediction image of the PU by the inter prediction.

The inter-prediction image generation unit 309 reads the reference picture block at a position indicated by the motion vector mvLX based on the PU to be decoded from the reference picture memory 306, to the reference picture list (the L0 list or the L1 list) where the prediction list utilization flag predFlagLX is 1, from the reference picture indicated by the reference picture index refIdxLX. Based on the read reference picture block, the inter-prediction image generation unit 309 performs prediction to generate the prediction image of the PU. The inter-prediction image generation unit 309 outputs the generated prediction image of the PU to the addition unit 312.

In a case that the prediction mode predMode indicates the intra prediction mode, the intra-prediction image generation unit 310 uses the intra prediction parameter input from the intra prediction parameter decoding unit 304 and the read reference picture to perform the intra prediction. Specifically, the intra-prediction image generation unit 310 reads from the reference picture memory 306 the adjacent PU present within a previously defined range from the PU to be decoded, out of the already decoded PUs which are a picture to be decoded. The previously defined range is any one of the adjacent PU in the left, upper left, above, and upper right of the PU to be decoded, for example, in a case that the PU to be decoded moves sequentially in order of a so-called raster scan, and differs depending on each intra prediction mode. The raster scan order is an order in which the PU to be decoded is moved sequentially from a left to a right in each line from an upper and to a lower, in each picture.

The intra-prediction image generation unit 310 performs prediction on the read adjacent PU in the prediction mode indicated by the intra prediction mode IntraPreMode to generate the prediction image of the PU. The intra-prediction image generation unit 310 outputs the generated prediction image of the PU to the addition unit 312.

In the intra prediction parameter decoding unit 304, in a case that the intra prediction mode different between luminance and chrominance is derived, the intra-prediction image generation unit 310 generates the prediction image of the PU of the luminance based on any one of the planar prediction (0), the DC prediction (1), and the direction prediction (2 to 34), according to the luminance prediction mode IntraPredModeY, and generates the prediction image of the PU of the chrominance based on any one of the planar prediction (0), the DC prediction (1), the direction prediction (2 to 34), and the LM mode (35), according to the chrominance prediction mode IntraPredModeC.

The inverse quantization/inverse DCT unit 311 inversely quantizes the quantization coefficient input from the entropy decoding unit 301 to derive the DCT coefficient. The inverse quantization/inverse DCT unit 311 performs Inverse Discrete Cosine Transform (DCT) on the derived DCT coefficient to calculate the residual signal. The inverse quantization/inverse DCT unit 311 outputs the calculated residual signal to the addition unit 312.

The addition unit 312 adds the prediction image of the PU input from the inter-prediction image generation unit 309 or the intra-prediction image generation unit 310 and the residual signal input from the inverse quantization/inverse DCT unit 311 for each pixel to generate the decoded image of the PU. The addition unit 312 stores the generated decoded image of the PU into the reference picture memory 306, and outputs the decoded image Td obtained by integrating the generated decoded image of the PU for each picture, to the outside.

Configuration of Image Coding Apparatus

Figure 6:
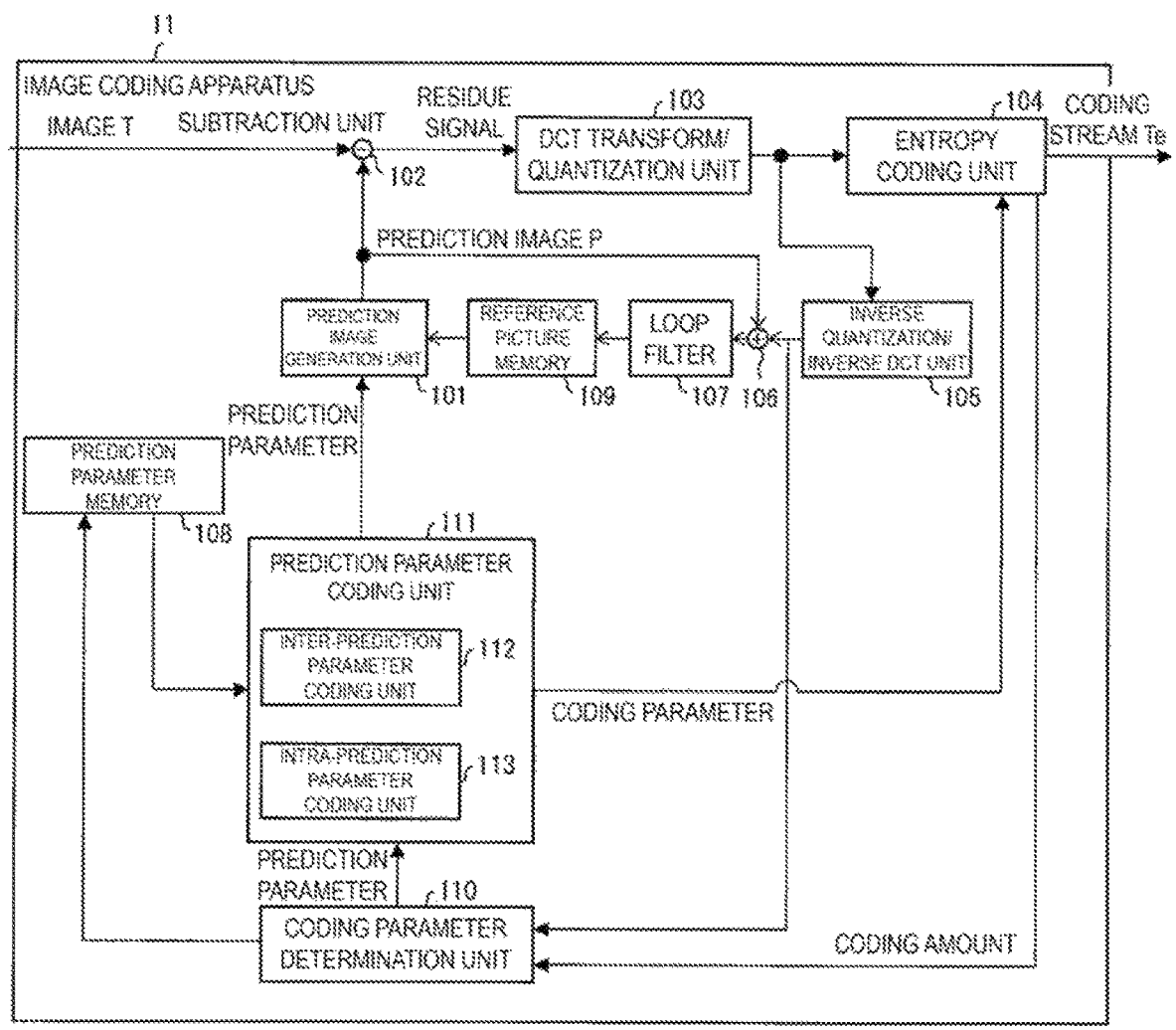
FIG. 6 is a schematic diagram illustrating a configuration of an image decoding apparatus according to one embodiment of the present invention.

Next, a configuration of the image coding apparatus 11 according to the present embodiment will be described. FIG. 6 is a block diagram illustrating the configuration of the image coding apparatus 11 according to the present embodiment. The image coding apparatus 11 includes a prediction image generation unit 101, a subtraction unit 102, a DCT/quantization unit 103, an entropy coding unit 104, an inverse quantization/inverse DCT unit 105, an addition unit 106, a loop filter 107, a prediction parameter memory (prediction parameter storage unit, frame memory) 108, a reference picture memory (reference image storage unit, frame memory) 109, a coding parameter determination unit 110, and a prediction parameter coding unit 111. The prediction parameter coding unit 111 includes an inter prediction parameter decoding unit 112 and an intra prediction parameter decoding unit 113.

For each picture of the image T, the prediction image generation unit 101 generates a prediction image P of the prediction unit PU, for each coding unit CU that is a region obtained by splitting the picture. Here, the prediction image generation unit 101 reads the decoded block from the reference picture memory 109, based on the prediction parameter input from the prediction parameter coding unit 111. In the case of the inter prediction, for example, the prediction parameter input from the prediction parameter coding unit 111 is a motion vector. The prediction image generation unit 101 reads a block positioned on the reference image indicated by the motion vector from the target PU which is a starting point. Furthermore, in the case of the intra prediction, the prediction parameter is an intra prediction mode, for example. A pixel value of the adjacent PU used in the intra prediction mode is read from the reference picture memory 109 to generate the prediction image P of the PU. For the read reference picture block, the prediction image generation unit 101 generates the prediction image P of the PU by using one prediction method out of multiple prediction methods. The prediction image generation unit 101 outputs the generated prediction image P of the PU to the subtraction unit 102.

Figure 7:
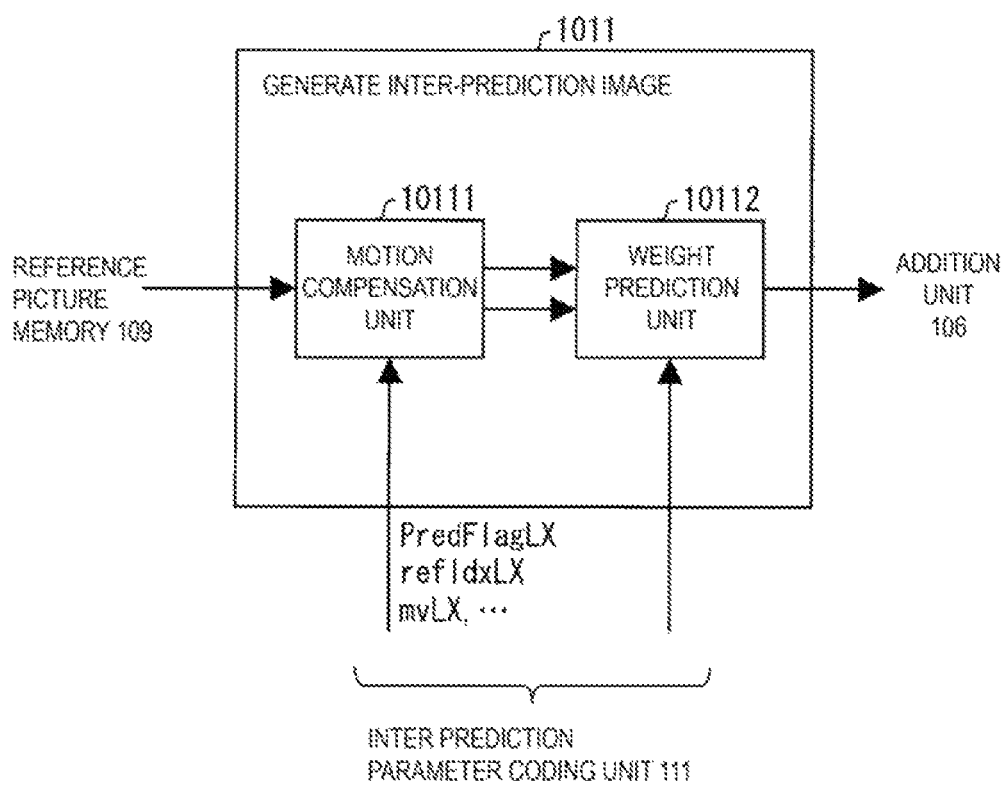
FIG. 7 is a schematic diagram illustrating a configuration of an inter-prediction image generation unit of the image coding apparatus according to one embodiment of the present invention.

Note that the prediction image generation unit 101 operates similarly to the above-described prediction image generation unit 308. For example, FIG. 7 is a schematic diagram illustrating a configuration of the inter-prediction image generation unit 1011 included in the prediction image generation unit 101. The inter-prediction image generation unit 1011 includes a motion compensation unit 10111 and a weight prediction unit 10112. The motion compensation unit 10111 and the weight prediction unit 10112 are constituted similarly to the above-described motion compensation unit 3091 and weight prediction unit 3094 respectively, and thus, these are not described here.

The prediction image generation unit 101 uses the parameter input from the prediction parameter coding unit to generate the prediction image P of the PU based on the pixel value of the reference block read from the reference picture memory. The prediction image generated by the prediction image generation unit 101 is output to the subtraction unit 102 and the addition unit 106.

The subtraction unit 102 subtracts a signal value of the prediction image P of the PU input from the prediction image generation unit 101 from the pixel value of the corresponding PU of the image T to generate the residual signal. The subtraction unit 102 outputs the generated residual signal to the DCT/quantization unit 103.

The DCT/quantization unit 103 performs DCT on the residual signal input from the subtraction unit 102 to calculate the DCT coefficient. The DCT/quantization unit 103 quantizes the calculated DCT coefficient to derive the quantization coefficient. The DCT/quantization unit 103 outputs the derived quantization coefficient to the entropy coding unit 104 and the inverse quantization/inverse DCT unit 105.

To the entropy coding unit 104, the quantization coefficient is input from the DCT/quantization unit 103, and the coding parameter is input from the prediction parameter coding unit 111. The input coding parameter includes a code such as the reference picture index refIdxLX, the prediction vector index mvp_LX_idx, the difference vector mvdLX, the prediction mode predMode, and the merge index merge_idx.

The entropy coding unit 104 performs entropy coding on the input quantization coefficient and coding parameter to generate the coding stream Te, and outputs the generated coding stream Te to the outside.

The inverse quantization/inverse DCT unit 105 inversely quantizes the quantization coefficient input from the DCT/quantization unit 103 to derive the DCT coefficient. The inverse quantization/inverse DCT unit 105 performs inverse DCT on the derived DCT coefficient to calculate the residual signal. The inverse quantization/inverse DCT unit 105 outputs the calculated residual signal to the addition unit 106.

The addition unit 106 adds the signal value of the prediction image P of the PU input from the prediction image generation unit 101 and the signal value of the residual signal input from the inverse quantization/inverse DCT unit 105 for each pixel to generate the decoded image. The addition unit 106 stores the generated decoded image into the reference picture memory 109.

The loop filter 107 performs a deblocking filter, a sample adaptive offset (SAO), and an adaptive loop filter (ALF), on the decoded image generated by the addition unit 106.

The prediction parameter memory 108 stores the prediction parameter generated by the coding parameter determination unit 110, at a previously defined position for each picture and CU to be coded.

The reference picture memory 109 stores the decoded image generated by the loop filter 107, at a previously defined position for each picture and each CU to be decoded.

The coding parameter determination unit 110 selects one set, out of multiple sets of the coding parameters. The coding parameter is the above-described prediction parameter or a parameter to be coded which is generated in association with the prediction parameter. The prediction image generation unit 101 uses each of the sets of these coding parameters to generate the prediction image P of the PU.

The coding parameter determination unit 110 calculates a cost value indicating a size of information amount on each of multiple sets and a coding difference. The cost value is a sum of a coding amount and a value obtained by multiplying a square error with a coefficient λ. The coding amount is an information amount of the coding stream Te obtained by performing entropy coding on the quantization error and the coding parameter. The square error is a sum between pixels on a square value of a residual value of the residual signal calculated in the subtraction unit 102. The coefficient λ is a preset actual number lager than zero. The coding parameter determination unit 110 selects a set of the coding parameters where the calculated cost value is the smallest. As a result, the entropy coding unit 104 outputs the set of the selected coding parameters to the outside, as the coding stream Te, and does not output the set of the unselected coding parameters. The coding parameter determination unit 110 stores the determined coding parameter into the prediction parameter memory 108.

The prediction parameter coding unit 111 derives a format for coding from the parameter input from the coding parameter determination unit 110, and outputs the same to the entropy coding unit 104. The derivation of the format for coding means to derive the difference vector from the motion vector and the prediction vector, for example. Furthermore, the prediction parameter coding unit 111 derives a parameter required for generating the prediction image from the parameter input from the coding parameter determination unit 110, and outputs the same to the prediction image generation unit 101. The parameter required for generating the prediction image is the motion vector in units of sub block, for example.

The inter prediction parameter decoding unit 112 derives, based on the prediction parameter input from the coding parameter determination unit 110, the inter prediction parameter such as the difference vector. The inter prediction parameter decoding unit 112 is configured to derive the parameter required for generating the prediction image output to the prediction image generation unit 101, and includes the same configuration as the configuration where the inter prediction parameter decoding unit 303 (see FIG. 6 and the like) derives the inter prediction parameter. The inter prediction parameter decoding unit 112 will be described in detail, later.

The intra prediction parameter decoding unit 113 a format (MPM_idx, rem_intra_luma_pred_mode, and the like) for coding, from the intra prediction mode IntraPreMode input from the coding parameter determination unit 110.

Configuration of Image Decoding Apparatus

Figure 10:
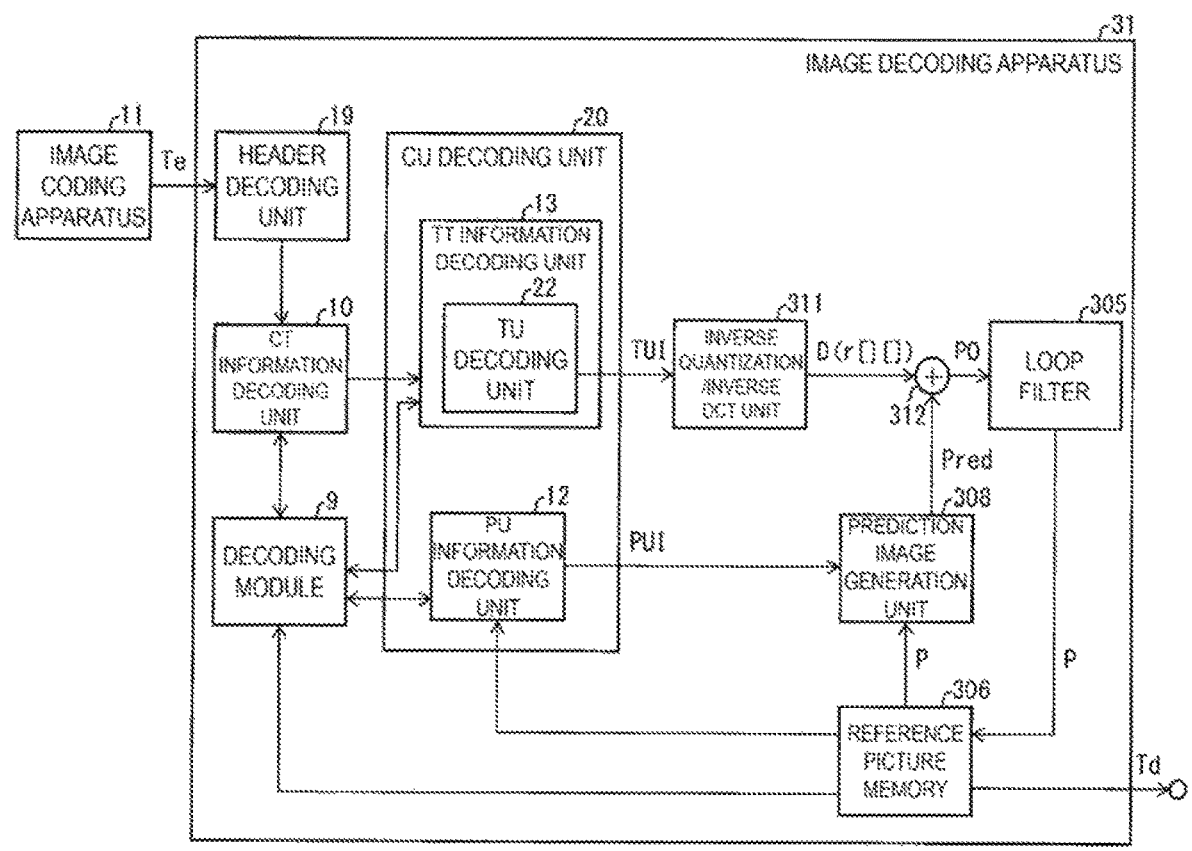
FIG. 10 is a block diagram illustrating a configuration of the image decoding apparatus according to one embodiment of the present invention.

FIG. 10 is a block diagram illustrating a configuration of the image decoding apparatus according to the present embodiment. In FIG. 10, for simplicity, illustrations of some members included in the block diagram illustrated in FIG. 10 are omitted. Furthermore, for sake of description, a member having the same function as the member illustrated in FIG. 5 is allotted with the same numeral, and the description will be omitted.

As illustrated in FIG. 10, the image decoding apparatus 31 includes a decoding module 9, a CT information decoding unit 10 (a constraint flag decoding unit, a constraint state determination unit, a constraint state setting unit, and a flag setting unit), the prediction image generation unit 308, the inverse quantization/inverse DCT unit 311, the reference picture memory 306, the addition unit 312, the loop filter 305, a header decoding unit 19, and a CU decoding unit 20. The CU decoding unit 20 further includes a PU information decoding unit 12, and a TT information decoding unit 13, and the TT information decoding unit 13 further includes a TU decoding unit 22.

Decoding Module

A simplified operation of each module will be described below. The decoding module 9 performs a decoding process of decoding a syntax value of binary data. More specifically, the decoding module 9 decodes, based on the coded data and a syntax category supplied from a supply source, the syntax value coded according to an entropy coding scheme such as CABAC and returns the decoded syntax value to the supply source.

In an example illustrated below, the supply source of the coded data and the syntax category are the CT information decoding unit 10, and the CU decoding unit 20 (the PU information decoding unit 12 and the TT information decoding unit 13) (prediction-unit decoding unit).

Header Decoding Unit

The header decoding unit 19 decodes a video parameter set (VPS), an SPS, a PPS, a slice header of the coded data input from the image coding apparatus 11.

CT Information Decoding Unit

The CT information decoding unit 10 uses the decoding module 9 to perform a decoding process of the coding tree unit and the coding tree, on the coded data input from the image coding apparatus 11. Specifically, the CT information decoding unit 10 decodes CTU information and CT information from the coded data according to the following procedure.

First, the CT information decoding unit 10 uses the decoding module 9 to decode a tree unit header CTUH from the CTU information included in the CTU. Next, the CT information decoding unit 10 decodes the QT split flag indicating whether to perform the QT split on the target CT and the BT split mode indicating the split method of the BT split of the target CT, from the CT information included in the CT, and recursively splits the target CT for decoding until the QT split flag and the BT split mode do not signal a further split. Finally, a tree unit footer CTUF is decoded from the CTU information.

The tree unit header CTUH and the tree unit footer CTUF includes the coding parameter for the image decoding apparatus 31 to refer to determine the decoding method of a target coding tree unit. Furthermore, the CT information may include, in addition to the QT split flag and the BT split mode, a parameter applied in the target CT and a lower coding node.

CU Decoding Unit

The CU decoding unit 20 includes the PU information decoding unit 12 and the TT information decoding unit 13, and decodes PU1 information and TTI information of the least significant coding tree CT (that is, the CU).

PU Information Decoding Unit

In the PU information decoding unit 12, the PU information of each PU (merge flag (merge_flag), a merge index (merge_idx), a prediction motion vector index (mvp_idx), a reference image index (ref_idx), an inter prediction identifier (inter_pred_flag), and a difference vector (mvd) and the like)) is decoded by using the decoding module 9.

TT Information Decoding Unit

The TT information decoding unit 13 uses the decoding module 9 to decode each TTI (TU split flag SP_TU (split transform_flag), CU residual flag CBP_TU (cbf_cb, cbf_cr, cbf_luma) and the like, and TU).

The TT information decoding unit 13 also includes the TU decoding unit 22. The TU decoding unit 22 decodes QP update information (a quantization correction value) in a case that the residual is included in the TU. Note that the QP update information is a value indicating a difference value from a quantization parameter prediction value qPpred that is a prediction value of a quantization parameter QP. Furthermore, the TU decoding unit 22 decodes a quantization prediction residual (residual_coding).

PU Information Decoding

In the image decoding apparatus 31 according to the present embodiment, decoding of the PU is constrained in a case that the target CT is in a PU constraint state. More specifically, in the image decoding apparatus 31, in a case that the target CT is in the PU constraint state, prediction is performed while regarding the target CT as a virtual PU. That is, in the image decoding apparatus 31, the PU information is decoded in a CU to be decoded first in the target CT (that is, the CU positioned at an upper left in the target CT) to generate the prediction image. On the other hand, in another CU, the PU information is not decoded, and the PU information (prediction information) decoded in the CU positioned at the upper left in the target CT is used to generate the prediction image. A virtual PU across one or more CUs is referred to as "merged PU", below.

Figure 11:
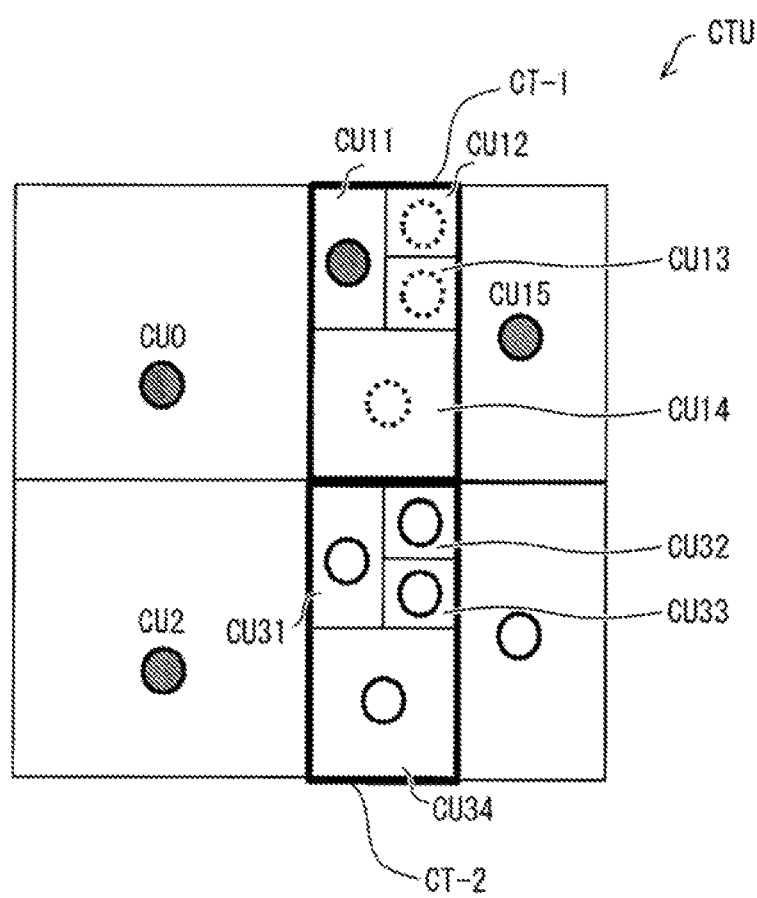
FIG. 11 is a diagram illustrating an example of CTU split.

For example, in a split example of the CTU illustrated in FIG. 11, CT-1 is in the PU constraint state (represented as the black circle), and CT-2 is not in the PU constraint state (represented as white circle). In this case, CT-1 is in the PU constraint state, and thus, the PU information is decoded in CU11, and in other CU12 to CU14, the PU information is not decoded. On the other hand, CT-2 is not in the PU constraint state, and thus, even in the same split pattern as in CT-1, the PU information is decoded in each CU31 to CU34.

CT Information Decoding Process

Figure 12:
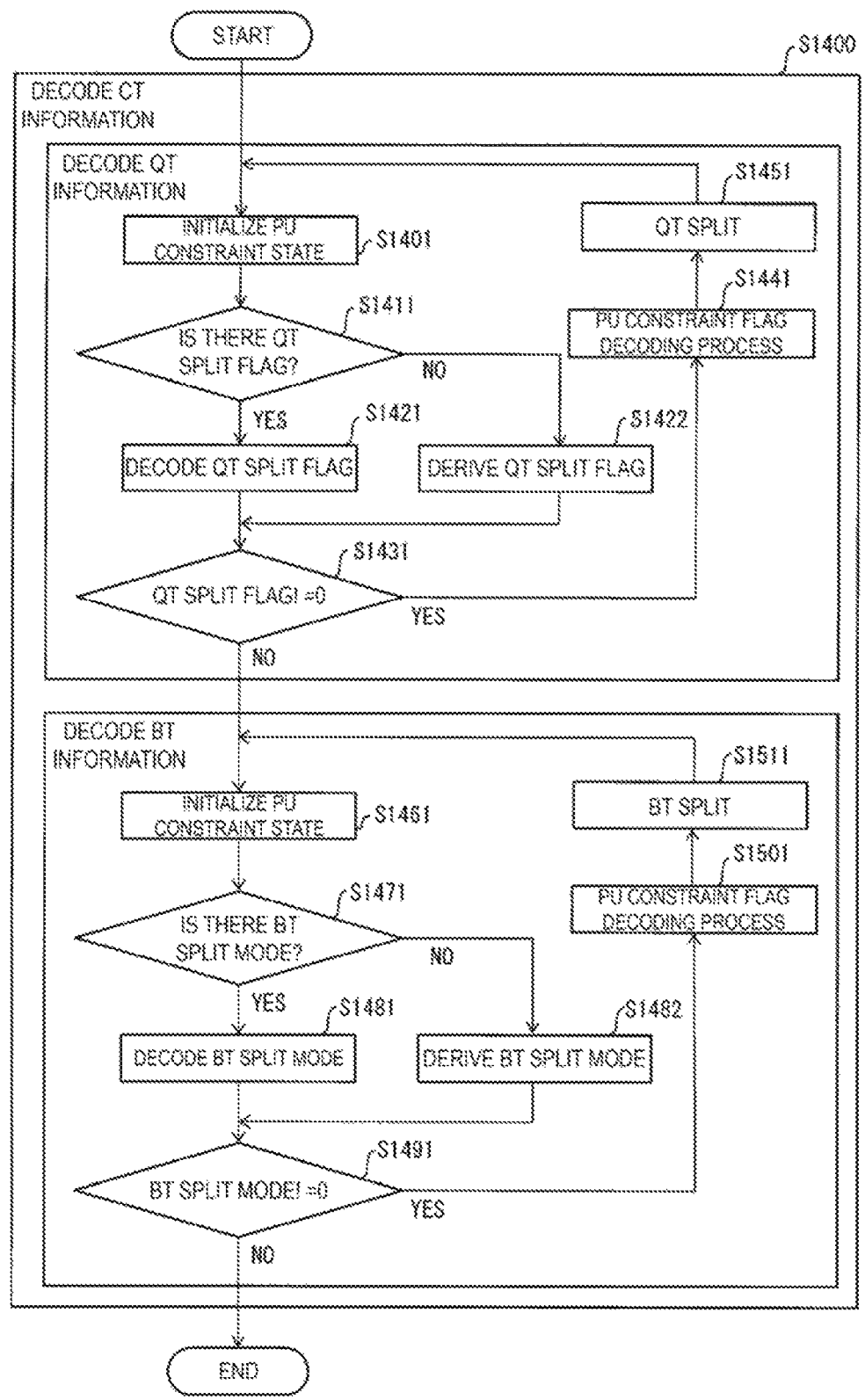
FIG. 12 is a flowchart describing an operation of a CT information decoding unit according to one embodiment of the present invention.

An operation of constraining the decoding of the PU information according to the PU constraint state will be described in detail with reference to FIG. 12 to FIG. 14. FIG. 12 is a flowchart describing an operation of the CT information decoding unit 10 according to one embodiment of the present invention. Furthermore, FIG. 13 shows an example of a configuration of a syntax table of the QT information according to one embodiment of the present invention, and FIG. 14 shows an example of a configuration of a syntax table of the BT information according to one embodiment of the present invention.

First, the CT information decoding unit 10 performs CT information decoding S1400. In the CT information decoding S1400 by the CT information decoding unit 10, QT information decoding and BT information decoding are performed. The QT information decoding and the BT information decoding by the CT information decoding unit 10 will be described in order, below.

The CT information decoding unit 10 decodes the CT information from the coded data, and recursively decodes a coding tree CT (coding_quadtree). Specifically, the CT information decoding unit 10 decodes the QT information, and decodes a target coding tree coding_quadtree (x0, y0, log 2CbSize, cqtDepth). Note that x0, y0 are upper left coordinates of the target coding tree, and log 2CbSize is a logarithm CT size (for example, if the CT size is 64, 128, 256, then 6, 7, 8) that is a logarithm where CT size of 2 that is a size of the coding tree is base. cqtDepth is a CT depth (QT depth) indicating a hierarchy of the coding tree.

(S1401) First, the CT information decoding unit 10 initializes PU constraint state IsPUConstraint indicating whether or not in a state where the decoding of the PU is constrained in the CT, to 0, in a case that a prescribed condition is satisfied. A procedure of initializing the PU constraint state IsPUConstraint by the CT information decoding unit 10 will be described later.

(S1411) The CT information decoding unit 10 determines whether or not the decoded CT information has the QT split flag. Specifically, the CT information decoding unit 10 determines whether or not a logarithm CT size log 2CbSize is larger than a logarithmic value MinCbLog 2SizeY of a prescribed minimum CT size. In a case that the logarithm CT size log 2CbSize is larger than MinCbLog 2SizeY, the CT information decoding unit 10 determines that the decoded CT information has the QT split flag and the process transitions to S1421. Otherwise, the process transitions to S1422.

(S1421) The CT information decoding unit 10 decodes the QT split flag (split_cu_flag) that is the syntax element in a case that it is determined that the logarithm CT size log 2CbSize is larger than MinCbLog 2SizeY.

(S1422) Otherwise (in a case that the logarithm CT size log 2CbSize is equal to or less than MinCbLog 2SizeY), that is, a QT split flag split_cu_flag does not appear in the coded data, the CT information decoding unit 10 omits decoding the QT split flag split_cu_flag from the coded data, and derives the QT split flag split_cu_flag as 0.

(S1431) In a case where the QT split flag split_cu_flag is other than 0 (=1), the process transitions to S1441. Otherwise (in a case that the QT split flag split_cu_flag is 0), the process transitions to S1461.

(S1441) In a case that the PU constraint state IsPUConstraint is in an invalid state (IsPUConstraint=0), the CT information decoding unit 10 decodes the PU constraint flag (pu_constraint_flag) from the coded data.

Figure 15:
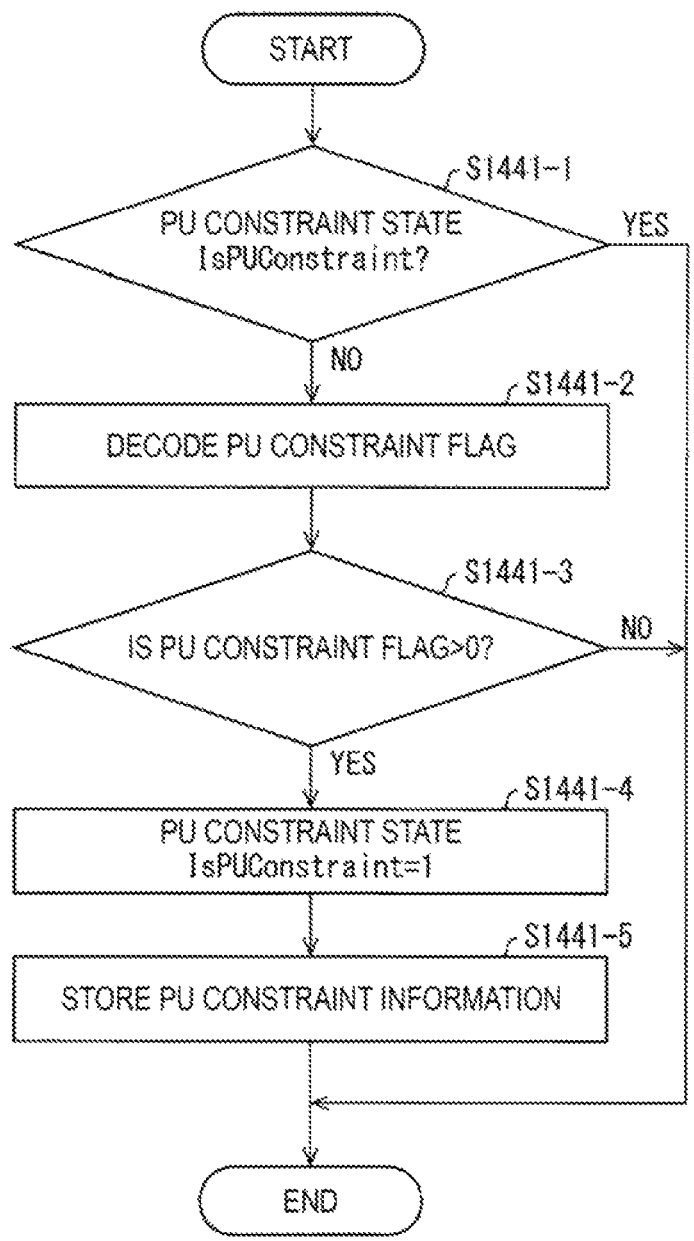
FIG. 15 is a flowchart illustrating a procedure of decoding a PU constraint flag by the CT information decoding unit according to one embodiment of the present invention.

A procedure of decoding, by the CT information decoding unit 10, the PU constraint flag is illustrated in FIG. 15.

(S1441-1)

In the case that the PU constraint state IsPUConstraint is in the invalid state (IsPUConstraint=0), the CT information decoding unit 10 transitions to S1441-2. On the other hand, in a case that the PU constraint state IsPUConstraint is in a valid state, the process is ended and the process transitions to S1451.

(S1441-2)

The CT information decoding unit 10 decodes the PU constraint flag pu_constraint_flag from the coded data.

(S1441-3)

In a case that the PU constraint flag pu_constraint_flag is other than 0 (=1), the process transitions to S1441-4 and the process transitions to the PU constraint state. On the other hand, in a case that the PU constraint flag pu_constraint_flag is 0 (=0), the process is ended and the process transitions to S1451.
(S1441-4)

The CT information decoding unit 10 sets the PU constraint state IsPUConstraint to 1.
(S1441-5)

Furthermore, the CT information decoding unit 10 stores, as PU constraint information, information on the CT at a timepoint when that the process moves to the PU constraint state (merged PU). Specifically, the CT information decoding unit 10 stores upper left coordinates (x0, y0) of the target CT as upper left coordinates (xMergedPU, yMergedPU) of the merged PU as in the following equations, as the PU constraint information, and stores the logarithm CT size log 2CbSize, as a logarithm PU size log 2MergedPUSize of the merged PU.

xMergedPU=x0 yMergedPU=y0 log 2MergedPUSize=log 2CbSize

Upon ending the above-described processes, the CT information decoding unit 10 implements a below-described process (S1451), and moves to a lower hierarchy by one level to repeat the processes after (S1401).

(S1451) The CT information decoding unit 10 performs the QT split. Specifically, the CT information decoding unit 10 decodes the four coding trees CT of the logarithm CT size log 2CbSize−1 at positions (x0, y0), (x1, y0), (x0, y1), and (x1, y1) of a CT depth cqtDepth+1.

coding_quadtree(x0,y0, log 2CbSize−1,cqtDepth+1)

coding_quadtree(x1,y0, log 2CbSize−1,cqtDepth+1)

coding_quadtree(x0,y1, log 2CbSize−1,cqtDepth+1)

coding_quadtree(x1,y1, log 2CbSize−1,cqtDepth+1)

Here, x0, y0 are the upper left coordinates of the target coding tree, and x1, y1 are derived by adding ½ the logarithm CT size (1<<log 2CbSize) to (x0, y0) as in the following equations.

x1=x0+(1<<(log 2CbSize−1))

y1=y0+(1<<(log 2CbSize−1))

Note that << indicates a left shift. 1<<N is the same value of the n-th power of 2 (hereinafter, the same applies). Likewise, >> indicates a right shift.

Then, the CT information decoding unit 10 adds one to CT depth cqtDepth indicating the hierarchy of the coding tree. The logarithm CT size log 2CbSize that is a logarithmic value of the coding unit size is subtracted by one (½ the CT size) and updated.

cqtDepth=cqtDepth+1 log 2CbSize=log 2CbSize−1

Also in a lower coding tree CT, the CT information decoding unit 10 uses the updated upper left coordinates, the logarithm CT size, and the CT depth to continue the QT information decoding started from S1401.

The CT information decoding unit 10 decodes the CT information from the coded data, and recursively decodes a coding tree CT (coding_binarytree). Specifically, the CT information decoding unit 10 decodes the BT information, and decodes a target coding tree coding_binarytree (x0, y0, log 2CbWidth, log 2CbHeight, cqtDepth, cbtDepth). Note that x0, y0 are the upper left coordinates of the target coding tree, log 2CbWidth is a logarithmic value of a width of the coding tree, log 2CbHeight is a logarithmic value of a height of the coding tree, cqtDepth is a CT depth (QT depth) indicating a hierarchy of the coding tree, and cbtDepth is a CT depth (BT depth) indicating a hierarchy of the coding tree.

(S1461) First, the CT information decoding unit 10 initializes the PU constraint state IsPUConstraint in the CT to 0, in a case that a prescribed condition is satisfied. A procedure of initializing the PU constraint state IsPUConstraint by the CT information decoding unit 10 will be described later.

(S1471) The CT information decoding unit 10 determines whether or not the decoded CT information has the BT split mode (split information). Specifically, the CT information decoding unit 10 determines whether or not a height of the coding tree (1<<log 2CbHeight) is larger than minBTSize, or whether or not a width of the coding tree (1<<log 2CbWidth) is larger than minBTSize, and whether or not the width of the coding tree (1<<log 2CbWidth) is equal to or larger than maxBTSize, and whether or not the height of the coding tree (1<<log 2CbHeight) is equal to or larger than maxBTSize, and whether or not cbtDepth is smaller than maxBTDepth. minBTSize is a minimum BT size (minimum size of a leaf node of a binary tree), maxBTSize is a maximum BT size (maximum size of a root node of the binary tree), and maxBTDepth is a maximum depth (maximum value of a depth of the binary tree).

Then CT information decoding unit 10 determines that the decoded CT information has the BT split mode in a case that the above-described condition is satisfied, and transitions to S1481. Otherwise, the process transitions to S1482.

(S1481) The CT information decoding unit 10 decodes a BT split mode split_bt_mode [x0][y0] that is the syntax element in the case that the above-described condition is satisfied.

(S1482) Otherwise (in a case that the above-described condition is not satisfied), that is, in a case that the BT split mode split_bt_mode [x0][y0] does not appear in the coded data, the CT information decoding unit 10 omits decoding the BT split mode split_bt_mode [x0][y0] from the coded data, and derives the BT split mode split_bt_mode [x0][y0] as 0.

(S1491) The CT information decoding unit 10 transitions to S1501 in a case that the BT split mode split_bt_mode [x0][y0] is other than 0 (=1 or 2). Otherwise (in a case that the BT split mode split_bt_mode [x0][y0] is 0), the CT information decoding unit 10 does not split the target coding tree but ends the process.

(S1501) In a case that the PU constraint state IsPUConstraint is in an invalid state, the CT information decoding unit 10 decodes the PU constraint flag (pu_constraint_flag) from the coded data.

Specifically, the CT information decoding unit 10 performs a process illustrated in FIG. 15. That is, in the case that the PU constraint state IsPUConstraint is in the invalid state, the PU constraint flag pu_constraint_flag is decoded (S1441-1, S1441-2). In a case that the PU constraint flag pu_constraint_flag is 1, the PU constraint state IsPUConstraint is set to 1 (S1441-3, S1441-4). Furthermore, the CT information decoding unit 10 stores upper left coordinates (x0, y0) of the target CT as upper left coordinates (xMergedPU, yMergedPU) of the merged PU, and stores the logarithm CT size log 2CbSize (=log 2CbWidth+log 2CbHeight), as a logarithm PU size log 2MergedPUSize of the merged PU (S1441-5). Thereafter, the CT information decoding unit 10 implements a below-described process (S1511), and moves to a lower hierarchy by one level to repeat the processes after (S1461).

(S1511) The CT information decoding unit 10 performs the BT split. Specifically, in a case that the BT split mode split_bt_mode [x0][y0] is 1, the CT information decoding unit 10 decodes two coding trees CT where logarithmic values of a width and a height are log 2CbWidth and log 2CbHeight−1, respectively, at positions (x0, y0), (x0, y1) of CT depth cbtDepth+1.

coding_binarytree(x0,y0, log 2CbWidth, log 2CbHeight−1,cqtDepth,cbtDepth+1)

coding_binarytree(x0,y1, log 2CbWidth, log 2CbHeight−1, cqtDepth, cbtDepth+1)

On the other hand, in a case that the BT split mode split_bt_mode [x0][y0] is 2, the CT information decoding unit 10 decodes two coding trees CT where logarithmic values of a width and a height are log 2CbWidth−1 and log 2CbHeight, respectively, at positions (x0, y0), (x1, y0) of CT depth cbtDepth+1.

coding_binarytree(x0,y0, log 2CbWidth−1, log 2CbHeight,cqtDepth,cbtDepth+1)

coding_binarytree(x1,y0, log 2CbWidth−1, log 2CbHeight,cqtDepth,cbtDepth+1)

Here, x0, y0 are the upper left coordinates of the target coding tree, and x1, y1 are derived by adding ½ of (1<<log 2CbWidth) and ½ of (1<<log 2CbHeight) to (x0, y0), respectively, as in the following equations.

$$x1=x0+(1<<(\log 2CbWidth-1))$$

$$y1=y0+(1<<(\log 2CbHeight-1))$$

Note that << indicates a left shift. 1<<N is the same value of the n-th power of 2 (hereinafter, the same applies). Likewise, >> indicates a right shift.

Then, the CT information decoding unit 10 adds 1 to CT depth cbtDepth indicating the hierarchy of the coding tree, and subtracts log 2CbWidth or log 2CbHeight by 1 for update.

cbtDepth=cbtDepth+1 log 2CbWidth=log 2CbWidth−1 log 2CbHeight=log 2CbHeight−1

Also in a lower coding tree CT, the CT information decoding unit 10 uses the updated upper left coordinates, the logarithmic values of the width and the height of the CT, and the BT hierarchy to continue the BT information decoding started from S1461.

PU Information Decoding Process

FIG. 16 shows an example of a configuration of a syntax table of CU information according to one embodiment of the present invention.

The CU decoding unit 20 decodes the CU information from the coded data and recursively decodes the coding unit CU (coing_unit). Specifically, the CU decoding unit 20 decodes the CU information and decodes the target coding unit coing_unit (x0, y0, log 2CbWidth, log 2CbHeight). Note that x0, y0 are the upper left coordinates of the target coding unit, log 2CbWidth is the logarithmic value of the width of the coding unit, and log 2CbHeight is the logarithmic value of the height of the coding unit.

The CU decoding unit 20 decodes the PU information of the target CU in a case that the PU constraint state IsPUConstraint of the target CU is in an invalid state, or in a case that the upper left coordinates (x0, y0) of the target CU is the same in position as the stored upper left coordinates (xMergedPU, yMergedPU) of the merged PU.

On the other hand, the CU decoding unit 20 reuses the PU information of the CU at the upper left (the coordinates are (xMergedPU, yMergedPU)) of the target CT in a case that the PU constraint state IsPUConstraint of the target CU is in a valid state, and in a case that the upper left coordinates (x0, y0) of the target CU is not the same in position as the stored upper left coordinates (xMergedPU, yMergedPU) of the merged PU.

Thus, in the image decoding apparatus 31 according to the present embodiment, in the case that the target CT is in the PU constraint state, prediction is performed while regarding a whole of the target CT as one virtual PU. As a result, in the image decoding apparatus 31, it is possible to perform prediction by using a virtually large block while maintaining a split with high degree of freedom by the QT split and the BT split. At this time, a unit of coding/decoding the prediction information can be controlled by PU constraint flag pu_constraint_flag. Consequently, it is possible to reduce an amount of prediction information to be coded/decoded, and thus, it is possible to reduce complexity of coding/decoding the image.

Note that the CT information decoding described above is a decoding method while assuming a case where the QT and the BT are different layers. In this method, it is not possible to perform the QT split after the BT split; however, it is possible to eliminate the necessity to determine whether or not the QT split flag is present after the BT split. However, the present embodiment is not limited thereto, and a decoding method may be employed in which the QT and the BT are assumed to be the same layers. In this case, both the QT split and the BT split can be selected, that is, the QT split can be also performed after the BT split; but it is necessary to determine whether or not the QT split flag is present every time.

Initialize PU Constraint State

A procedure of initializing the PU constraint state IsPUConstraint by the CT information decoding unit 10 (S1401) will be described in FIG. 17.

(S1601)

First, the CT information decoding unit 10 determines whether or not the CT size of the target CT is equal to or more than a PU constraint size. Specifically, the CT information decoding unit 10 determines whether or not the logarithm CT size log 2CbSize of the target CT is equal to or more than the PU constraint size.

In a case that the CT size of the target CT is equal to or more than the PU constraint size, the process transitions to S1602 to cancel the PU constraint state IsPUConstraint. On the other hand, in a case that the CT size of the target CT is less than the PU constraint size, the process is ended.

Here, the CT information decoding unit 10 sets the PU constraint size as follows. The CT information decoding unit 10 sets the PU constraint size to 0 in a case that the CT depth cqtDepth is 0. In this case, the CT size of the target CT satisfies the PU constraint size (=0) or more, and thus, the CT information decoding unit 10 initializes the PU constraint state IsPUConstraint. As a result, in the case that the CT depth cqtDepth is 0, the PU constraint state is canceled. Furthermore, the CT information decoding unit 10 sets the CT size (=logarithm size of merged PU log 2MergedPUSize) at a timepoint when that the process moves to the PU constraint state, to the PU constraint size. That is, the CT information decoding unit 10 initializes the PU constraint state IsPUConstraint in a case that the logarithm CT size log 2CbSize of the target CT is equal to or more than the logarithm size of merged PU log 2MergedPUSize. As a result, the PU constraint state is canceled at a timepoint when that the process moves to the CT having the same or larger CT size at a timepoint when that the process moves to the PU constraint state.

In a case that the CT size of the target CT is equal to or more than the PU constraint size, the process transitions to S1602. On the other hand, in a case that the CT size of the target CT is less than the PU constraint size, the process is ended.

(S1602)

The CT information decoding unit 10 initializes the PU constraint state IsPUConstraint to 0, and cancels the PU constraint state. The CT information decoding unit 10 performs a process after the above-described S1411 upon ending these processes.

Modification-1

Figure 18:
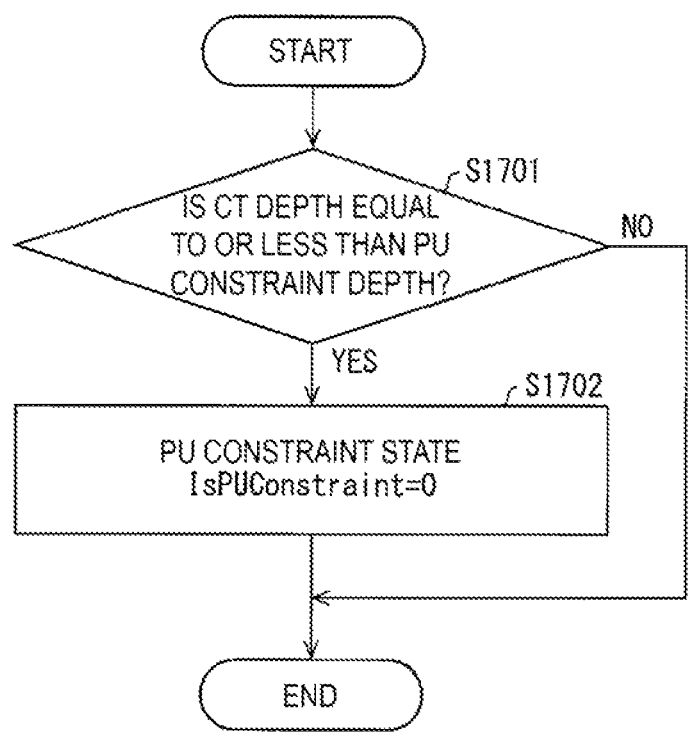
FIG. 18 is a flowchart illustrating a procedure of initializing the PU constraint state by the CT information decoding unit according to one embodiment of the present invention.

A modification of the procedure of initializing the PU constraint state IsPUConstraint by the CT information decoding unit 10 will be described in FIG. 18.

(S1701)

First, the CT information decoding unit 10 determines whether or not the CT depth cqtDepth of the target CT is equal to or less than a PU constraint depth. The logarithm CT size log 2CbSize of the target CT can be expressed as log 2CbSize=(log 2MaxCUSize−cqtDepth), and the logarithm size of merged PU log 2MergedPUSize can be expressed as log 2MergedPUSize=(log 2MaxCUSize−MergedPUDepth). Thus, the CT depth may be used instead of the CT size of a logarithm CT for the determination of whether or not to initialize the PU constraint state IsPUConstraint. Note that log 2MaxCUSize is a maximum value of the logarithm CU size, and MergedPUDepth is a merged PU depth indicating a hierarchy of the merged PU.

Here, in a case that the CT depth cqtDepth is 0, it is necessary to initialize the PU constraint state IsPUConstraint, and thus, the PU constraint depth may be set to the maximum CT depth maxCTDepth. In a case that the CT depth cqtDepth is other than 0, the PU constraint depth may be set to a PU depth of merged PU MergedPUDepth.

In a case that the CT depth cqtDepth of the target CT is equal to or less than the PU constraint depth, the process transitions to S1702. On the other hand, in a case that the CT depth cqtDepth of the target CT is larger than the PU constraint depth, the process is ended.

(S1702)

The CT information decoding unit 10 initializes the PU constraint state IsPUConstraint to 0, and ends the process.

CT Information Decoding Process

The CT information decoding S1400 by the CT information decoding unit 10 in this case will be described. Only a feature different from the above-described CT information decoding S1400 will be described below. Furthermore, FIG. 19 shows an example of a configuration of a syntax table of the QT information according to the present modification, and FIG. 20 shows an example of a configuration of a syntax table of the BT information according to the present modification.

In the QT information decoding, in S1401, as described above, the CT information decoding unit 10 initializes the PU constraint state IsPUConstraint to 0 in a case that the CT depth cqtDepth of the target CT is equal to or less than the PU constraint depth (cqtDepth<=MergedPUDepth).

In S1411 to S1431, the same processes as the processes described above are performed; however, in S1441, in a case that the CT information decoding unit 10 stores the PU constraint information, the upper left coordinates (x0, y0) of the target CT are stored as the upper left coordinates (xMergedPU, yMergedPU) of the merged PU, and the CT depth cqtDepth of the target CT is stored as the merged PU depth MergedPUDepth of the merged PU. Thereafter, in S1451, the same process as the process described above is performed.

Likewise, in the BT information decoding, in S1461, as described above, the CT information decoding unit 10 initializes the PU constraint state IsPUConstraint to 0 in a case that the CT depth cqtDepth of the target CT is equal to or less than the PU constraint depth (cqtDepth<=MergedPUDepth).

In S1471 to S1491, the same processes as the processes described above are performed; however, in S1501, in a case that the CT information decoding unit 10 stores the PU constraint information, the upper left coordinates (x0, y0) of the target CT are stored as the upper left coordinates (xMergedPU, yMergedPU) of the merged PU, and the CT depth cqtDepth of the target CT is stored as the merged PU depth MergedPUDepth of the merged PU. Thereafter, in S1511, the same process as the process described above is performed.

Modification-2

Another modification of the procedure of initializing the PU constraint state IsPUConstraint by the CT information decoding unit 10 will be described in FIG. 21.

(S1801)

First, the CT information decoding unit 10 determines whether or not the CT size of the target CT is equal to or more than a prescribed size. Specifically, the CT information decoding unit 10 determines whether or not the logarithm CT size log 2CbSize of the target CT is equal to or more than a prescribed size THSize. The prescribed size THSize may be arbitrarily set, use a value coded with the slice header, and use a value coded with a parameter set such as an SPS and a PPS.

In a case that the CT size of the target CT is equal to or more than the prescribed size THSize, the process transitions to S1811 to cancel the PU constraint state. On the other hand, in a case that the CT size of the target CT is less than the prescribed size THSize, the process is ended.

(S1811)

The CT information decoding unit 10 initializes the PU constraint state IsPUConstraint to 0, and ends the process.

CT Information Decoding Process

Figure 21:
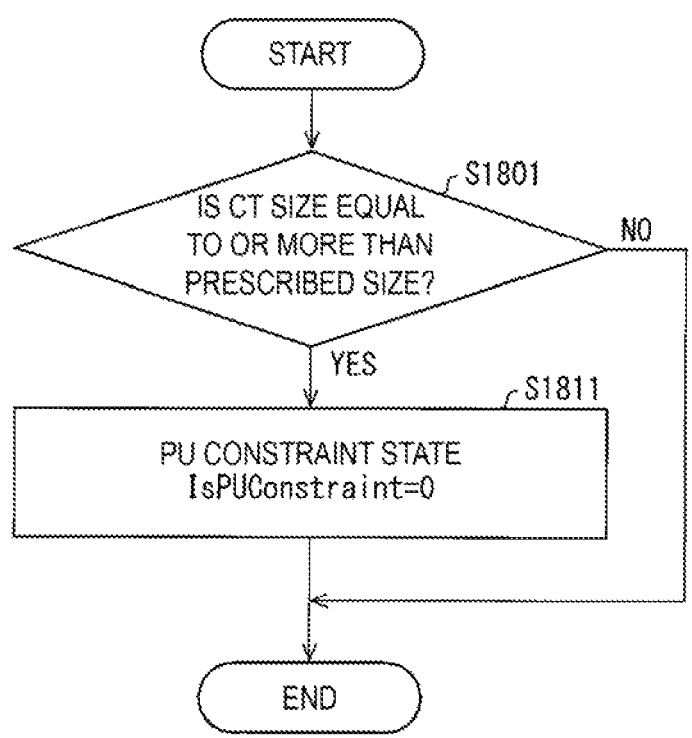
FIG. 21 is a flowchart illustrating a procedure of initializing the PU constraint state by the CT information decoding unit according to one embodiment of the present invention.

The CT information decoding S1400 by the CT information decoding unit 10 in a case that an initialization procedure in FIG. 21 is included will be described. Only a feature different from the above-described CT information decoding S1400 will be described below. FIG. 22 shows an example of a configuration of a syntax table of the QT information according to the present modification, and FIG. 23 shows an example of a configuration of a syntax table of the BT information according to the present modification.

In the QT information decoding, in S1401, as described above, in a case that the logarithm CT size log 2CbSize of the target CT is equal to or more than the prescribed size THSize (log 2CbSize>=THSize), the CT information decoding unit 10, initializes the PU constraint state IsPUConstraint to 0.

In S1411 to S1431, the same processes as the processes described above are performed; however, in S1441, in a case that the CT information decoding unit 10 stores the PU constraint information, the upper left coordinates (x0, y0) of the target CT are stored as the upper left coordinates (xMergedPU, yMergedPU) of the merged PU. Thereafter, in S1451, the same process as the process described above is performed. As described in the above-described S1441-1 and S1441-2, in a case that the PU constraint state IsPUConstraint is 1, the PU constraint flag pu_constraint_flag is not decoded.

Likewise, in the BT information decoding, in S1461, as described above, in the case that the logarithm CT size log 2CbSize of the target CT is equal to or more than the prescribed size THSize (log 2CbSize>=THSize), the CT information decoding unit 10 initializes the PU constraint state IsPUConstraint to 0.

In S1471 to S1491, the same processes as the processes described above are performed; however, in S1501, in a case that the CT information decoding unit 10 stores the PU constraint information, the upper left coordinates (x0, y0) of the target CT are stored as the upper left coordinates (xMergedPU, yMergedPU) of the merged PU. Thereafter, in S1511, the same process as the process described above is performed.

In the present modification, the PU constraint state IsPUConstraint is not initialized until the CT size of the target CT is equal to or more than the prescribed size THSize. That is, in a case that the PU constraint state IsPUConstraint is set to 1 in a certain CT, the PU constraint state is maintained until the CT size of the target CT is equal to or more than the prescribed size THSize in the subsequent hierarchy. As a result, in a case that the PU constraint state IsPUConstraint is set to 1 in a certain CT, it is possible to omit decoding the PU constraint flag pu_constraint_flag until the CT size of the target CT is equal to or more than the prescribed size THSize. For example, in a case that a prescribed size is 16×16 (in the logarithm size, THSize=4), the PU constraint flag is not coded more than once in the block of 16×16, and thus, it is possible to prevent a coding amount of the PU constraint flag from being too large.

Second Embodiment

The coding amount of the PU constraint flag pu_constraint_flag itself is large, and thus, in a case that the PU constraint flag pu_constraint_flag is coded at each hierarchy of the QT and the BT, a total coding amount is too large. Therefore, in the present embodiment, to reduce the coding amount, the image coding apparatus 11 codes the PU constraint flag pu_constraint_flag in the QT only.

That is, in the image decoding apparatus 31, the PU constraint flag pu_constraint_flag of the target CT is decoded in the QT only. Therefore, in the image decoding apparatus 31, in a case that in the QT, the PU constraint state IsPUConstraint is set to I in a certain CT, the PU constraint state is established while including the BT in the subsequent hierarchy. As a result, in the BT, coding/decoding the PU constraint flag pu_constraint_flag is not needed, and thus, it is possible to reduce the coding amount of the PU constraint flag pu_constraint_flag.

CT Information Decoding Process

Figure 24:
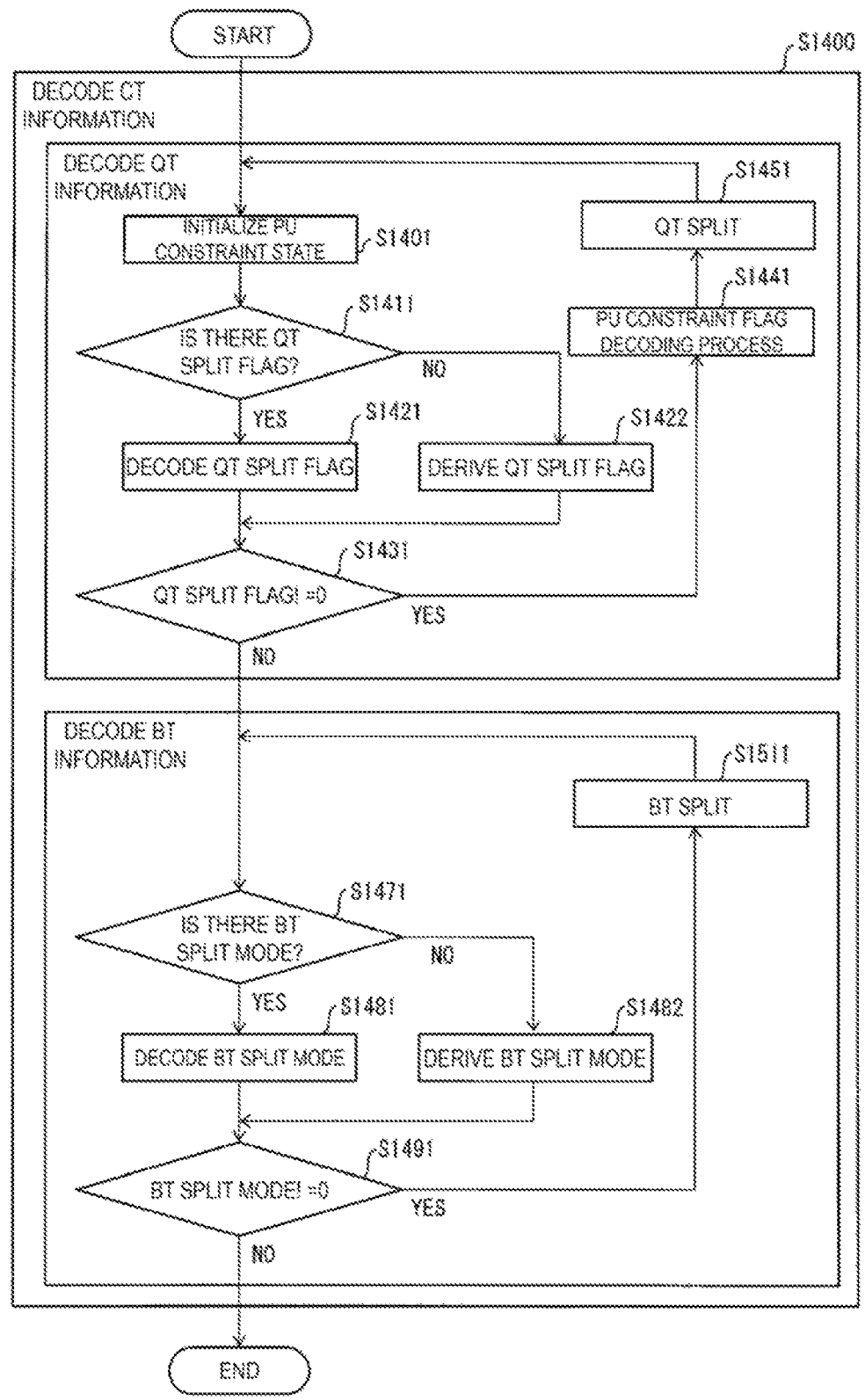
FIG. 24 is a flowchart describing an operation of the CT information decoding unit according to one embodiment of the present invention.

The CT information decoding S1400 by the CT information decoding unit 10 in this case will be described with reference to FIG. 24 and FIG. 25. Only a feature different from the above-described CT information decoding S1400 will be described below. FIG. 24 is a flowchart describing an operation of the CT information decoding unit 10 according to one embodiment of the present invention. Furthermore, FIG. 25 shows an example of a configuration of a syntax table of the BT information according to the present modification. Note that an example of the configuration of the syntax table of the QT information according to the present modification is shown as in FIG. 13.

In the QT information decoding, the same process as the process described above is performed. That is, in S1401 to 1451, the same processes as the processes described above is performed.

On the other hand, in the BT information decoding, a process of S1461 is not performed and processes of S1471 to S1491 are performed. Furthermore, after S1491, a process of S1501 is not performed, and a process of S1511 is performed. That is, the CT information decoding unit 10 performs a process for the case that the target CT is in the PU constraint state, on the target CT in which the PU constraint state IsPUConstraint is set to 1 at a head of the QT. On the other hand, the CT information decoding unit 10 performs a process for the case that the target CT is not in the PU constraint state, on the target CT in which the PU constraint state IsPUConstraint is not set to 1 at the head of the QT (set to IsPUConstraint=0) because even if the target CT is thereafter split in the BT hierarchy, the PU constraint state IsPUConstraint is not set to 1.

Modification-1

A modification of the second embodiment will be described below. In the present modification, the image coding apparatus 11 codes the PU constraint flag pu_constraint_flag in a case that the CT size of the target CT is equal to or more than a prescribed size, and does not code the PU constraint flag pu_constraint_flag in a case that the CT size of the target CT is less than a prescribed size.

That is, in the case that the CT size of the target CT is equal to or more than a prescribed size, the image decoding apparatus 31 decodes the PU constraint flag pu_constraint_flag unless not in the PU constraint state IsPUConstraint. In a case that the PU constraint state IsPUConstraint is set to 1 in a certain CT, the PU constraint state is established in the subsequent hierarchy. On the other hand, in the case that the CT size of the target CT is less than a prescribed size, even when the PU constraint state IsPUConstraint is not established in a certain CT, the PU constraint flag pu_constraint_flag is not decoded. As a result, in the CT size less than a prescribed size, coding/decoding the PU constraint flag pu_constraint_flag is not needed, and thus, it is possible to reduce the coding amount of the PU constraint flag pu_constraint_flag.

CT information Decoding Process

Figure 26:
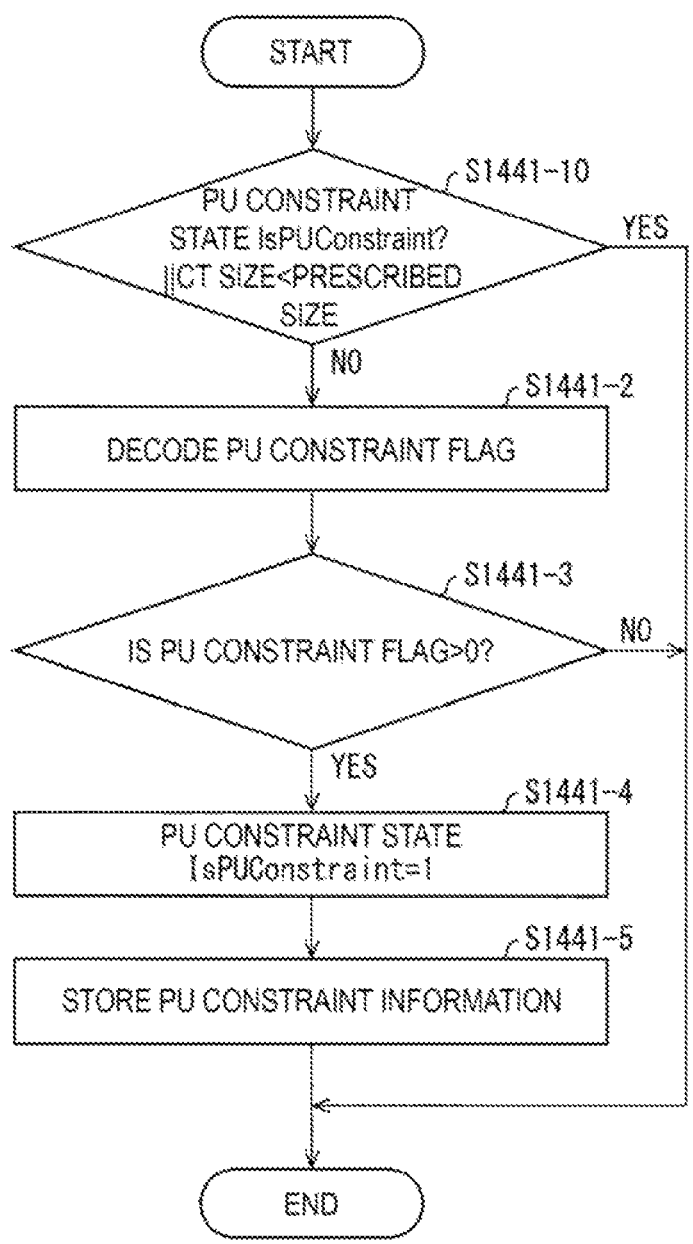
FIG. 26 is a flowchart illustrating a procedure of decoding the PU constraint flag by the CT information decoding unit according to one embodiment of the present invention.

The CT information decoding S1400 by the CT information decoding unit 10 in this case will be described with reference to FIG. 26 and FIG. 27. Only a feature different from the above-described CT information decoding S1400 will be described below. FIG. 26 is a flowchart illustrating a procedure of decoding the PU constraint flag by the CT information decoding unit 10 according to one embodiment of the present invention. Furthermore, FIG. 27 shows an example of a configuration of a syntax table of the QT information according to the present modification.

In the QT information decoding, in S1401 to S1431, the same processes as the processes described above are performed; however, in S1441

(S1441-10)

the CT information decoding unit 10 transitions to S1441-2 in a case that the PU constraint state IsPUConstraint is in the invalid state, and in a case that the CT size of the target CT is equal to or more than a prescribed size. Specifically, in a case that the PU constraint state IsPUConstraint is in the invalid state, and in a case that the logarithm CT size log 2CbSize of the target CT is equal to or more than a prescribed size Log 2MinPUSize (log 2CbSize>=Log 2MinPUSize), the CT information decoding unit 10 transitions to S1441-2. On the other hand, the CT information decoding unit 10 ends the process and transitions to S1451 in a case that the PU constraint state IsPUConstraint is in the valid state, or in a case that the CT size of the target CT is less than a prescribed size.

The subsequent processes are the same, and in S1441-2 to S1441-5 and S1451, the same processes as the processes described above are performed. In S1461, also in a case that the CT information decoding unit 10 initializes the PU constraint state IsPUConstraint (cancels the constraint), pu_constraint_flag is not necessarily decoded.

That is, even when the PU constraint state IsPUConstraint is in the invalid state, if the logarithm CT size log 2CbSize of the target CT is less than the prescribed size Log 2MinPUSize, the CT information decoding unit 10 transitions to S1451 without decoding the PU constraint flag pu_constraint_flag. In a case that the PU constraint state IsPUConstraint is in the PU constraint state, the PU information decoding unit 12 reuses the PU information of the merged PU (coordinates (xMergedPU, yMergedPU)) without decoding the PU information.

On the other hand, in the BT information decoding, a process may be similarly performed to in the QT information decoding, and a similar process to in the second embodiment may be performed.

Modification-2

Another modification of the second embodiment will be described below. In the present modification, the image coding apparatus 11 codes the PU constraint flag pu_constraint_flag in a case that the target CT is in a prescribed shape. The prescribed shape is a square shape (log 2CbWidth==log 2CbHeight), for example.

That is, in the image decoding apparatus 31, in a case that the target CT is in a prescribed shape, PU constraint flag pu_constraint_flag is decoded. Therefore, in the image decoding apparatus 31, in a case that the target CT is in a prescribed shape, if the PU constraint state IsPUConstraint is set to 1 in a certain CT, the PU constraint state is established in the subsequent hierarchy. On the other hand, in the CT not having a prescribed shape, coding/decoding of the PU constraint flag pu_constraint_flag is not needed, and thus, it is possible to reduce the coding amount of the PU constraint flag pu_constraint_flag. For example, in a case that the shape is a rectangular in the CT where the BT split is performed, coding/decoding of the PU constraint flag pu_constraint_fla is not needed, and thus, it is possible to reduce the coding amount of the PU constraint flag pu_constraint_flag.

CT Information Decoding Process

Figure 28:
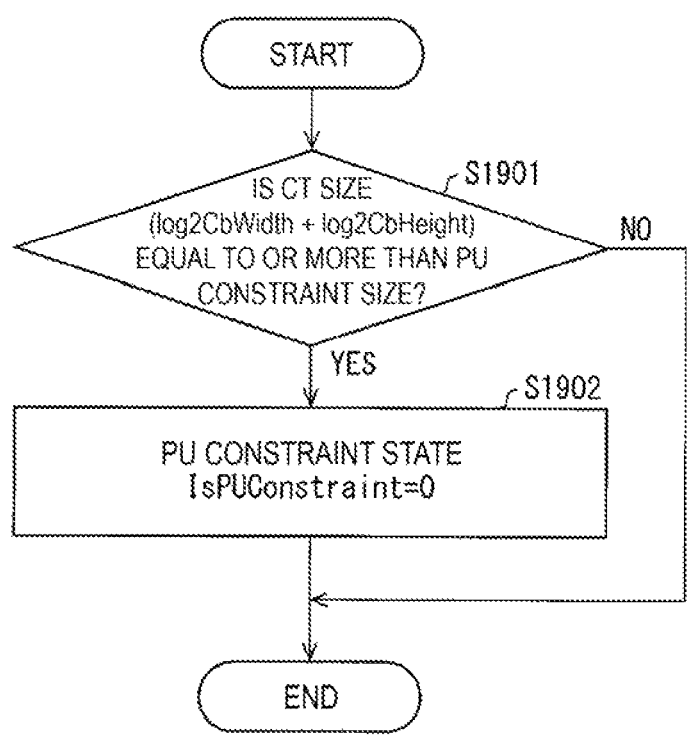
FIG. 28 is a flowchart illustrating a procedure of initializing the PU constraint state by the CT information decoding unit according to one embodiment of the present invention.
Figure 29:
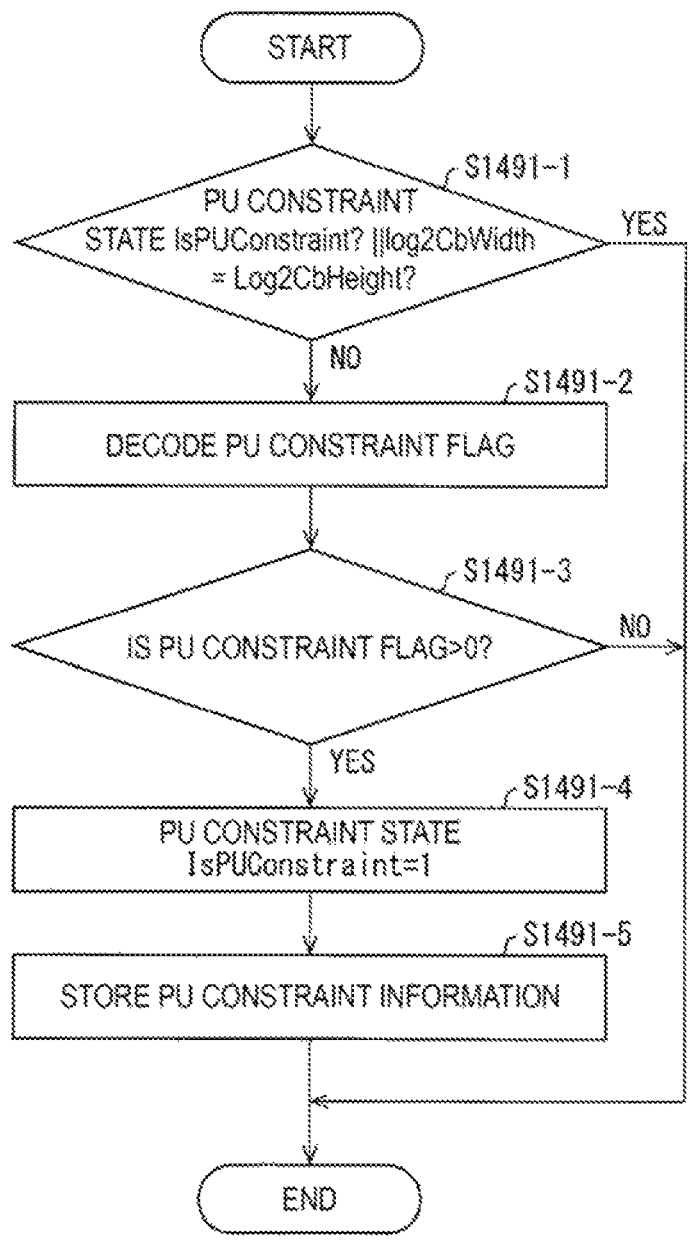
FIG. 29 is a flowchart illustrating a procedure of decoding the PU constraint flag by the CT information decoding unit according to one embodiment of the present invention.

The CT information decoding S1400 by the CT information decoding unit 10 in a case that the prescribed shape is the square will be described with reference to FIG. 28, FIG. 29, and FIG. 30. Only a feature different from the above-described CT information decoding S1400 will be described below. FIG. 28 is a flowchart illustrating a procedure of initializing, by the CT information decoding unit 10, the PU constraint state (S1401), and FIG. 29 is a flowchart illustrating a procedure of decoding, by the CT information decoding unit 10, the PU constraint flag. Furthermore, FIG. 30 shows an example of a configuration of a syntax table of the BT information according to the present modification. Note that a case is assumed where the prescribed shape is the square shape, below.

In the QT information decoding, the target CT is always the square, and thus, the same process as the process described above is performed. That is, in S1401 to 1451, the same processes as the processes described above is performed.

On the other hand, in the BT information decoding, in S1461, (S1901)

First, the CT information decoding unit 10 determines whether or not the CT size of the target CT is equal to or more than a PU constraint size. Specifically, the CT information decoding unit 10 determines whether or not the logarithm CT size log 2CbSize of the target CT is equal to or more than the logarithm size of merged PU log 2MergedPUSize.

In a case that the CT size of the target CT is equal to or more than the logarithm size of merged PU log 2MergedPUSize, the process transitions to S1902. On the other hand, in a case that the CT size of the target CT is less than the logarithm size of merged PU log 2MergedPUSize, the process is ended.

(S1902)

The CT information decoding unit 10 initializes the PU constraint state IsPUConstraint to 0, and ends the process. The CT information decoding unit 10 performs the processes of S1471 and S1481 after ending the above-described processes; however, in S1491, (S1491-1)

In a case that the PU constraint state IsPUConstraint is in the invalid state, and in a case that the target CT is in the prescribed shape, the CT information decoding unit 10 decodes the PU constraint flag pu_constraint_flag. Specifically, in a case that the PU constraint state IsPUConstraint is in the invalid state, and in a case that the target CT is in the square shape (log 2CbWidth==log 2CbHeight), the CT information decoding unit 10 transitions to S1491-2.

On the other hand, the CT information decoding unit 10 ends the process and transitions to S1501 in a case that the PU constraint state IsPUConstraint is in the valid state, or in a case that the target CT is not in the prescribed shape. Specifically, in a case that the PU constraint state IsPUConstraint is in the valid state or in a case that the target CT is not in the square shape (log 2CbWidth!=log 2CbHeight), the CT information decoding unit 10 ends the process and transitions to S1501.

(S1491-2)

The CT information decoding unit 10 decodes the PU constraint flag pu_constraint_flag from the coded data.

(S1491-3)

In a case that the PU constraint flag pu_constraint_flag is larger than 0 (=1), the process transitions to S1491-4. On the other hand, in a case that the PU constraint flag pu_constraint_flag is equal to or less than 0 (=0), the process is ended and the process transitions to S1501.

(S1491-4)

The CT information decoding unit 10 sets the PU constraint state IsPUConstraint to 1. The subsequent processes are the same, and in S1501, the same process as the process described above is performed.

That is, even when the PU constraint state IsPUConstraint is in the invalid state, if the target CT is not in the square shape, the CT information decoding unit 10 transitions to S1501 without decoding the PU constraint flag pu_constraint_flag. In a case that the PU constraint state IsPUConstraint is in the PU constraint state, the PU information decoding unit 12 reuses the PU information of the merged PU (coordinates (xMergedPU, yMergedPU)) without decoding the PU information.

Modification-3

Another modification of the second embodiment will be described below. In the present modification, the image coding apparatus 11 codes the PU constraint flag pu_constraint_flag only once at most, in the block having a certain prescribed size Log 2MinPUSize. Specifically, the image coding apparatus 11 introduces the flag IsPUConstraintFlagCoded indicating whether or not the PU constraint flag pu_constraint_flag is coded, and in a case that IsPUConstraintFlagCoded is 1, the pu_constraint_flag is not coded. Furthermore, IsPUConstraintFlagCoded is initialized to 0 only in a case that the CT size is equal to or more than a prescribed size.

That is, in the image decoding apparatus 31, in a case that the PU constraint flag pu_constraint_flag is already decoded and IsPUConstraintFlagCoded=1 in a certain CT, in the subsequent decoding process, the CT size of the target CT is equal to or more than a prescribed size, and the PU constraint flag pu_constraint_flag is not decoded until IsPUConstraintFlagCoded is initialized. As a result, in the block having a prescribed size, the PU constraint flag pu_constraint_flag is coded/decoded once at most only, and thus, it is possible to reduce the coding amount of the PU constraint flag pu_constraint_flag.

CT Information Decoding Process

Figure 31:
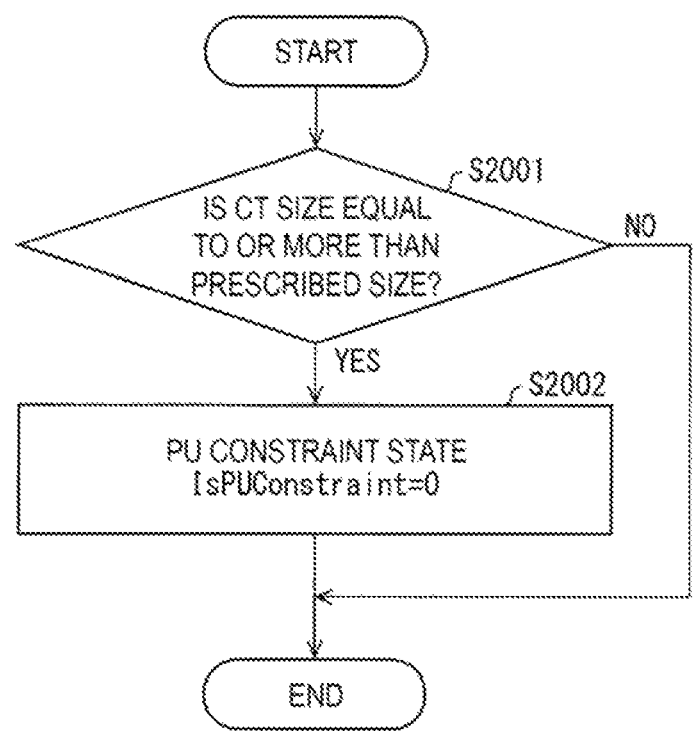
FIG. 31 is a flowchart illustrating a procedure of initializing flag IsPUConstraintFlagCoded by the CT information decoding unit according to one embodiment of the present invention.
Figure 32:
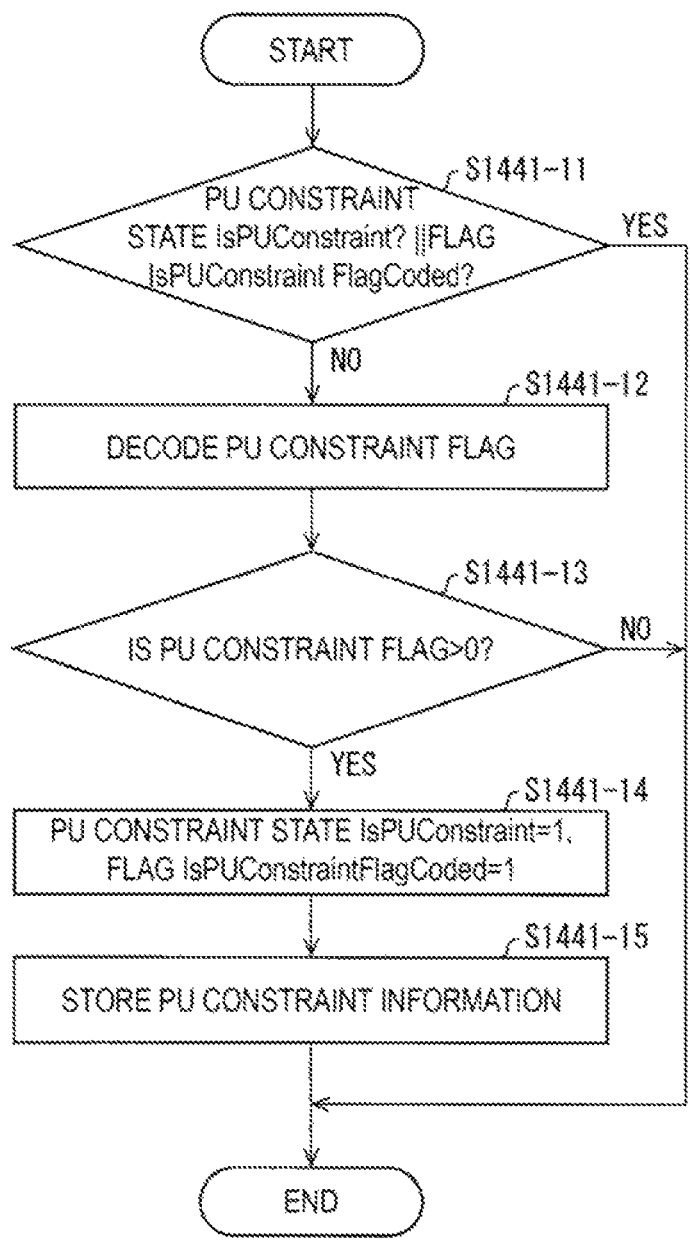
FIG. 32 is a flowchart illustrating a procedure of decoding the PU constraint flag by the CT information decoding unit according to one embodiment of the present invention.

The CT information decoding S1400 by the CT information decoding unit 10 in this case will be described with reference to FIG. 31, FIG. 32, and FIG. 33. Only a feature different from the above-described CT information decoding S1400 will be described below. FIG. 31 is a flowchart illustrating a procedure of initializing the flag IsPUConstraintFlagCoded by the CT information decoding unit 10, and FIG. 32 is a flowchart illustrating a procedure of decoding the PU constraint flag, by the CT information decoding unit 10. Furthermore, FIG. 33 shows an example of a configuration of a syntax table of the QT information according to the present modification.

In the QT information decoding, before S1401, (S2001)

the CT information decoding unit 10 determines whether or not the CT size of the target CT is equal to or more than a prescribed size. Specifically, the CT information decoding unit 10 determines whether or not the logarithm CT size log 2CbSize of the target CT is equal to or more than a prescribed size Log 2MinPUSize.

In a case that the CT size of the target CT is equal to or more than the prescribed size Log 2MinPUSize, the process transitions to S2002. On the other hand, in a case that the CT size of the target CT is less than the prescribed size Log 2MinPUSize, the process is ended.

(S2002)

The CT information decoding unit 10 initializes the flag IsPUConstraintFlagCoded to 0, and ends the process. The CT information decoding unit 10 performs the above-described processes of S1401 to S1431 after ending the above-described process; however, in S1441, (S1441-11)

In a case that the PU constraint state IsPUConstraint is in the invalid state, and in a case that the flag IsPUConstraintFlagCoded is 0, the CT information decoding unit 10 transitions to S1441-12. On the other hand, in a case that the PU constraint state IsPUConstraint is in the valid state, or in a case that the flag IsPUConstraintFlagCoded is 1, the process is ended and transitions to S1451.

(S1441-12)

The CT information decoding unit 10 decodes the PU constraint flag pu_constraint_flag from the coded data.

(S1441-13)

In a case that the PU constraint flag pu_constraint_flag is larger than 0 (=1), the process transitions to S1441-14. On the other hand, in a case that the PU constraint flag pu_constraint_flag is equal to or less than 0 (=0), the process is ended and the process transitions to S1451.

(S1441-14)

The CT information decoding unit 10 sets the PU constraint state IsPUConstraint to 1 and sets the flag IsPUConstraintFlagCoded to 1. The subsequent processes are the same, and in S1451, the same process as the process described above is performed.

That is, in a case that although the PU constraint state IsPUConstraint is in the invalid state, but flag IsPUConstraintFlagCoded is not 0, the CT information decoding unit 10 transitions to S1451 without decoding the PU constraint flag pu_constraint_flag. In a case that the PU constraint state IsPUConstraint is in the PU constraint state, the PU information decoding unit 12 reuses the PU information of the merged PU (coordinates (xMergedPU, yMergedPU)) without decoding the PU information.

On the other hand, in the BT information decoding, a process may be similarly performed to in the QT information decoding, and a similar process to in the second embodiment may be performed.

Third Embodiment

Figure 34A:
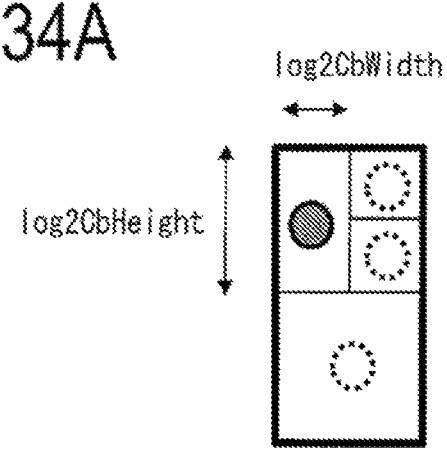
FIGS. 34A and 34B are diagrams each illustrating a block where a PU is decoded, under the PU constraint state according to one embodiment of the present invention.
Figure 34B:
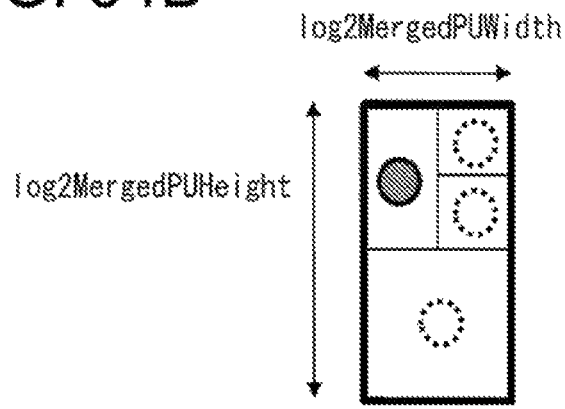

FIGS. 34A and 34B are diagrams each illustrating a block where the PU is decoded under the PU constraint state. In the first embodiment, as illustrated in FIG. 34A, in the CT where the PU constraint state is established, the PU information (prediction information) is decoded in the CU (log 2CbWidth, log 2CbHeight) to be decoded first in the CT (that is, the CU positioned at an upper left in the CT), in another CU, the PU information is not decoded, and the PU information (prediction information) of the CU positioned at the upper left is used; however, the embodiment of the present invention is not limited thereto. Therefore, in the present embodiment, as illustrated in FIG. 34B, rather than the PU information belonging to the CU at the upper left of the CT (merged PU) in the PU constraint state, the PU information (prediction information) on the entire merged PU (size is log 2MergedPUWidth, log 2MergerdPUHeight) is decoded.

CT Information Decoding Process

The CT information decoding S1400 by the CT information decoding unit 10 in this case will be described. Only a feature different from the above-described CT information decoding S1400 will be described below. FIG. 35 shows an example of a configuration of a syntax table of the QT information according to the present modification, and FIG. 36 shows an example of a configuration of a syntax table of the BT information according to the present modification.

In the QT information decoding, in S1401 to S1431, the same process as the process described above is performed; however, in S1441, in a case that the CT information decoding unit 10 stores the PU constraint information, the upper left coordinates (x0, y0) of the target CT are stored as the upper left coordinates (xMergedPU, yMergedPU) of the merged PU, and the logarithmic value log 2CbWidth of the width and the logarithmic value log 2CbHeight of the height of the target CT thereof are stored as a logarithmic value log 2MergedPUWidth of the height and a logarithmic value log 2MergedPUHeight of the height of the merged PU thereof, respectively. Thereafter, in S1451, the same process as the process described above is performed.

Likewise, in the BT information decoding, in S1461 to S1491, the same process as the process described above is performed; however, in S1501, in a case that the CT information decoding unit 10 stores the PU constraint information, the upper left coordinates (x0, y0) of the target CT are stored as the upper left coordinates (xMergedPU, yMergedPU) of the merged PU, and the logarithmic value log 2CbWidth of the width and the logarithmic value log 2CbHeight of the height of the target CT thereof are stored as a logarithmic value log 2MergedPUWidth of the height and a logarithmic value log 2MergedPUHeight of the height of the merged PU thereof, respectively. Thereafter, in S1511, the same process as the process described above is performed.

PU Information Decoding Process

Next, the CU information decoding by the CU decoding unit 20 will be described. A feature different from the feature of the CU information decoding mentioned in the first embodiment only will be described. FIG. 37 shows an example of a configuration of a syntax table of the CU information according to the present embodiment.

In a case that the PU constraint state IsPUConstraint of the target CU is in an invalid state, or in a case that the upper left coordinates (x0, y0) of the target CU is the same in position as the stored upper left coordinates (xMergedPU, yMergedPU) of the merged PU, the CU decoding unit 20 (PU information decoding unit 12) decodes the PU information of the stored merged PU (x0, y0, log 2MergedPU-Width, log 2MergedPUHeight).

Note that for the size of the merged PU in a case that the PU constraint state IsPUConstraint of the target CU is in the invalid state, the size of the target CU may be used. That is, the CU decoding unit 20 performs the following equation in a case that IsPUConstraint is 0.

log 2MergedPUWidth=log 2CbWidth log 2MergedPUHeight=log 2CbHeight

As a result, the prediction information of the entire merged PU can be derived, and thus, it is possible to expect to derive accurate prediction information. Specifically, in a case that the prediction information of the lower left and upper right adjacent PUs is referred, more accurate prediction information can be referred by using the PU size of the merged PU as the PU size of the PU, rather than the CU size of the CU positioned at the upper left of the target CT. Furthermore, in a sub block prediction, affine prediction, a matching prediction FRUC, and the like, the prediction information is derived from the entire block, and thus, the prediction accuracy is greatly improved.

Modification

A modification of a procedure of the PU information decoding by the CU decoding unit 20 will be described below. FIG. 38 shows an example of a configuration of a syntax table of the CU information according to the present embodiment.

In a case that the PU constraint state IsPUConstraint of the target CU is in a valid state, and in a case that the upper left coordinates (x0, y0) of the target CU is the same in position as the stored upper left coordinates (xMergedPU, yMergedPU) of the merged PU, the CU decoding unit 20 (PU information decoding unit 12) decodes the PU of the stored merged PU (x0, y0, log 2MergedPUWidth, log 2MergedPUHeight). Otherwise, the CU decoding unit 20 decodes the PU information of each CU in a case that the PU constraint state IsPUConstraint of the target CU is in a valid state, or the upper left coordinates (x0, y0) of the target CU is not the same in position as the stored upper left coordinates (xMergedPU, yMergedPU) of the merged PU.

On the other hand, in a case that the PU constraint state IsPUConstraint of the target CU is in the invalid state, the CU information decoding unit 20 decodes the PU of the target CU (x0, y0, log 2CbWidth, log 2CbHeight).

Application Example

The above-described image coding apparatus 11 and image decoding apparatus 31 can be utilized on various types of devices configured to transmit, receive, record, and reproduce a video. Note that the video may include a natural video captured by a camera or the like, and an artificial video (including CG and GUI) generated by a computer or the like.

First, a case where the above-described image coding apparatus 11 and image decoding apparatus 31 are utilized to transmit and receive the video will be described with reference to FIGS. 8A and 8B.

Figure 8A:
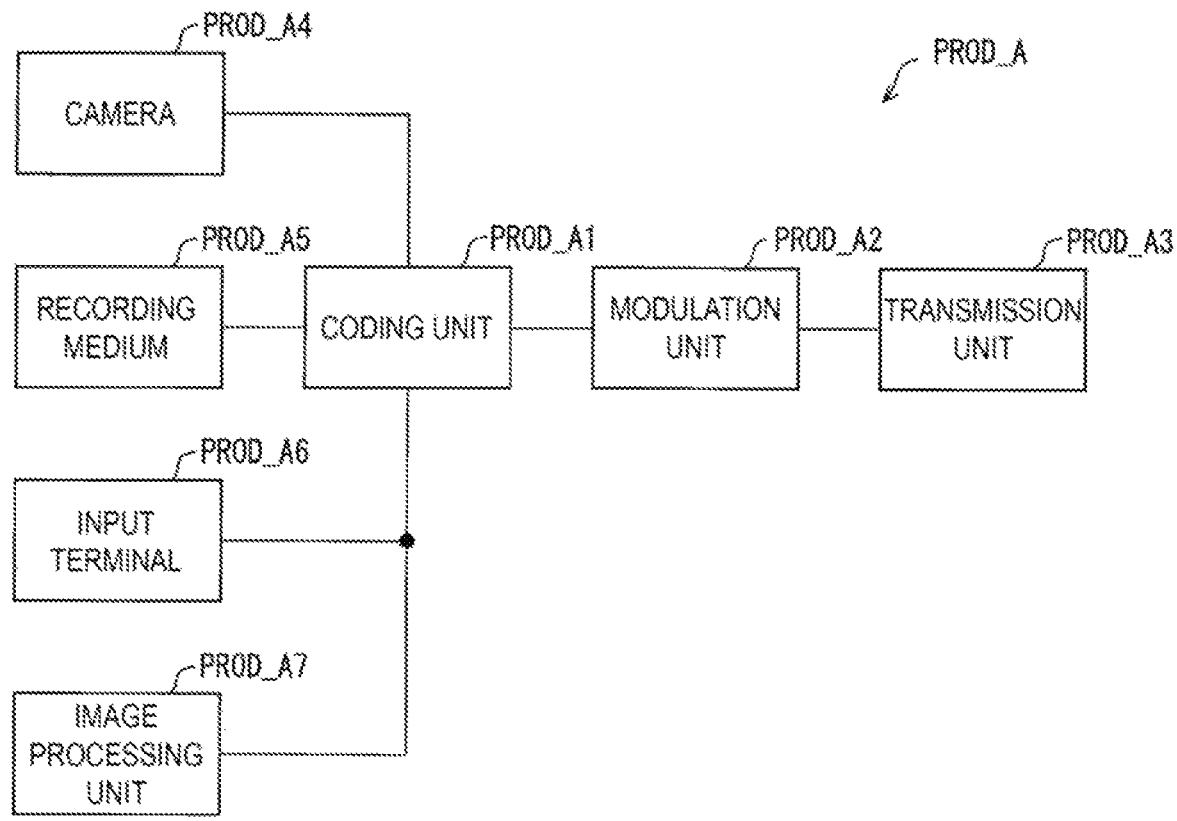
FIGS. 8A and 8B are diagrams illustrating configurations of a transmission device mounted with the image coding apparatus according to one embodiment of the present invention, and a reception device mounted with the image decoding apparatus thereof, where

FIG. 8A is a block diagram illustrating a configuration of a transmission device PROD_A mounted with the image coding apparatus 11. As illustrated in FIG. 8A, the transmission device PROD_A includes a coding unit PROD_A1 configured to obtain coded data by coding a video, a modulating unit PROD_A2 configured to obtain a modulation signal by modulating a carrier wave with the coded data obtained by the coding unit PROD_A1, and a transmission unit PROD_A3 configured to transmit the modulation signal obtained by the modulating unit PROD_A2. The above-described image coding apparatus 11 is utilized as the coding unit PROD_A1.

The transmission device PROD_A may further include a camera PROD_A4 configured to capture a video, as a supply source of the video input to the coding unit PROD_A1, a recording medium PROD_A5 configured to record the video, an input terminal PROD_A6 configured to input the video from outside, and an image processing unit A7 configured to generate or process an image. In FIG. 8A, a configuration where the transmission device PROD_A includes all of these components is illustrated; however, some of these components may be omitted.

Note that the recording medium PROD_A5 may have recorded an uncoded video, or a video coded according to a coding scheme for recording different from the coding scheme for transmission. In the latter, between the recording medium PROD_A5 and the coding unit PROD_A1, a decoding unit (not illustrated) configured to code the coded data read from the recording medium PROD_A5 according to the coding scheme for recording may be intervened.

Figure 8B:
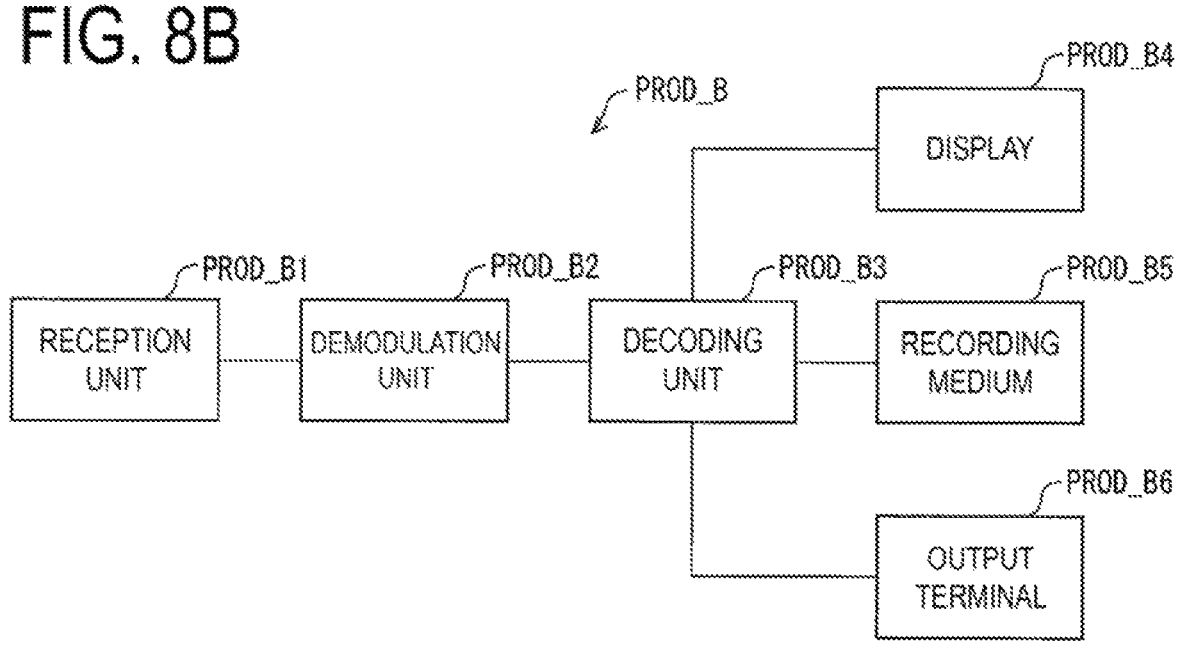

FIG. 8B is a block diagram illustrating a configuration of a reception device PROD_B mounted with the image decoding apparatus 31. As illustrated in FIG. 8B, the reception device PROD_B includes a reception unit PROD_B1 configured to receive the modulation signal, a modulation unit PROD_B2 configured to obtain the coded data by modulating the modulation signal received by the reception unit PROD_B1, and a decoding unit PROD_B3 configured to obtain the video by decoding the coded data obtained by the modulation unit PROD_B2. The above-described image decoding apparatus 31 is utilized as the decoding unit PROD_B3.

The reception device PROD_B may further include a display PROD_B4 configured to display a video, as a supply target of the video output from the decoding unit PROD_B3, a recording medium PROD_B5 configured to record the video, and an output terminal PROD_B6 configured to output the video to the outside. In FIG. 8B, a configuration where the reception device PROD_B includes all of these components is illustrated; however, a part of these components may be omitted.

Note that the recording medium PROD_B5 may be a medium for recording an uncoded video, and may be coded according to a coding scheme for recording different from the coding scheme for transmission. In the latter, between the decoding unit PROD_B3 and the recording medium PROD_B5, a coding unit (not illustrated) configured to code the video obtained from the decoding unit PROD_B3 according to the coding scheme for recording may be intervened.

Note that a transmission medium configured to transmit the modulation signal may be wireless or wired. Furthermore, a transmission manner to transmit the modulation signal may be broadcast (here, indicating a transmission manner with a previously unspecified transmission target), and may be communication (here, indicating a transmission manner with a previously specified transmission target). That is, the transmission of the modulation signal may be realized by any one of radio broadcast, wired broadcast, radio communication, and wired communication.

For example, a broadcast station (broadcast equipment) for terrestrial digital broadcasting/receiving station (such as a television receiver) is an example of the transmission device PROD_A/reception device PROD_B configured to transmit and receive the modulation signal by radio broadcast. Furthermore, a broadcast station (broadcast equipment) for cable television broadcasting/receiving station (such as a television receiver) is an example of the transmission device PROD_A/reception device PROD_B configured to transmit and receive the modulation signal by wired broadcast.

Furthermore, a server (such as a workstation)/client (such as a television receiver, a personal computer, and a smartphone) for a Video On Demand (VOD) service and a video sharing service where the Internet are used is an example of the transmission device PROD_A/reception device PROD_B configured to transmit and receive the modulation signal by communication (normally, in LAN, either radio communication or wired communication is used for a transmission medium, and in WAN, wired communication is used for the transmission medium). Here, the personal computer includes a desktop PC, a laptop PC, and a tablet PC. Furthermore, the smartphone includes a multipurpose mobile phone terminal.

Note that the client of the video sharing service includes a function of coding the video captured by a camera to upload the coded video to the server, in addition to a function of decoding the coded data downloaded from the server to display the decoded data on a display. That is, the client of the video sharing service functions as both the transmission device PROD_A and the reception device PROD_B.

Next, a case where the above-described image coding apparatus 11 and image decoding apparatus 31 are utilized for recording and reproducing the video will be described with reference to FIGS. 9A and 9B.

Figure 9A:
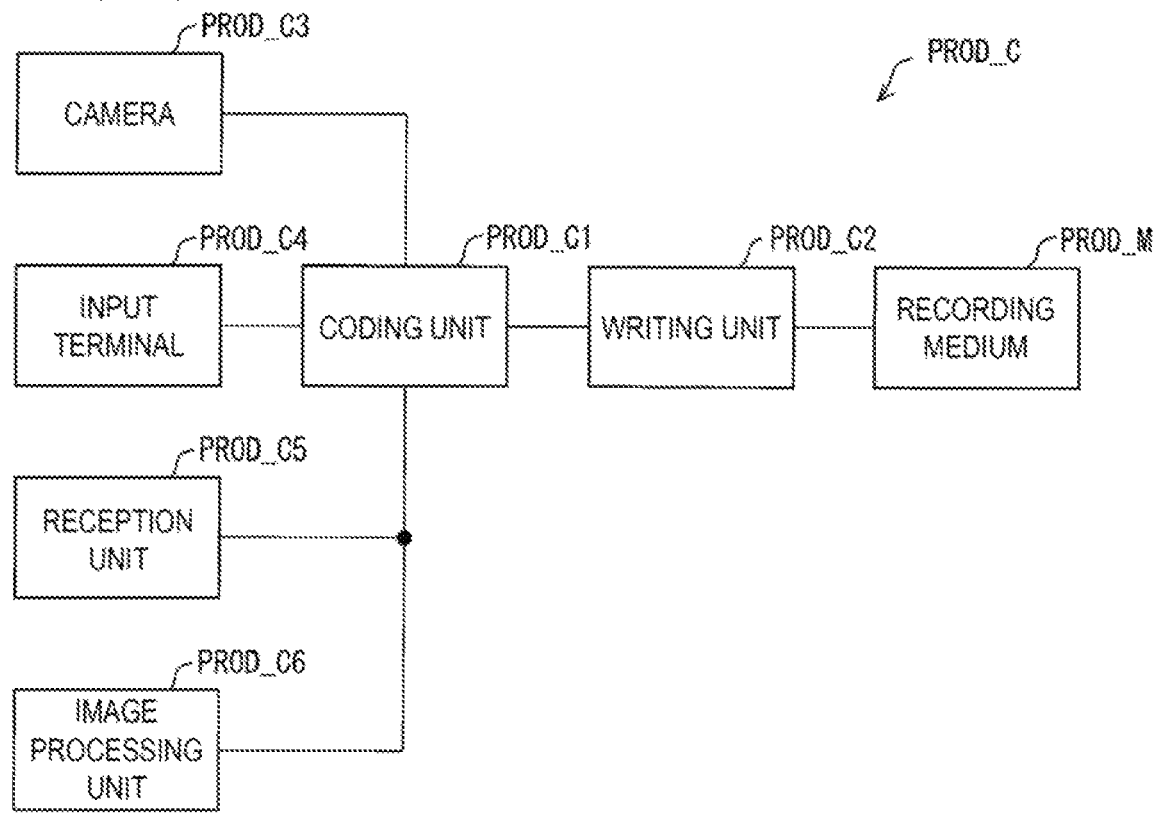
FIGS. 9A and 9B are diagrams illustrating configurations of a recording device mounted with the image coding apparatus according to one embodiment of the present invention, and a reproducing device mounted with the image decoding apparatus thereof, where

FIG. 9A is a block diagram illustrating a configuration of a recording device PROD_C mounted with the image coding apparatus 11. As illustrated in FIG. 9A, the recording device PROD_C includes a coding unit PROD_C1 configured to obtain coded data by coding a video, a writing unit PROD_C2 configured to write the coded data obtained by the coding unit PROD_C1 into a recording medium PROD_M. The above-described image coding apparatus 11 is utilized as the coding unit PROD_C1.

Note that the recording medium PROD_M may be (1) a type of medium to be contained in the recording device PROD_C such as a Hard Disk Drive (HDD) and a Solid State Drive (SSD), (2) a type of medium to be connected to the recording device PROD_C such as an SD memory card and a Universal Serial Bus (USB) flash memory, and (3) a type of medium to be loaded on a drive device (not illustrated) contained in the recording device PROD_C such as a Digital Versatile Disc (DVD) and a Blu-ray Disc (BD) (registered trademark).

Furthermore, the recording device PROD_C may further include a camera PROD_C3 configured to capture a video, as a supply source of the video input to the coding unit PROD_C1, an input terminal PROD_C4 configured to input the video from outside, a reception unit PROD_C5 configured to receive the video, and an image processing unit PROD_C6 configured to generate or process an image. In FIG. 9A, a configuration where the recording device PROD_C includes all of these components is illustrated; however, some of these components may be omitted.

Note that the reception unit PROD_C5 may be configured to receive an uncoded video, and configured to receive coded data coded by a coding scheme for transmission different from a coding scheme for recording. In the latter, between the reception unit PROD_C5 and the coding unit PROD_C1, a transmission decoding unit (not illustrated) configured to decode the coded data coded according to the coding scheme for transmission may be intervened.

Examples of such a recording device PROD_C include a DVD recorder, a BD recorder, and a Hard Disk Drive (HDD) (in which the input terminal PROD_C4 or the reception unit PROD_C5 serves as a main supply source of the video). Furthermore, examples of such a recording device PROD_C also include a cam coder (in which the camera PROD_C3 serves as a main supply source of the video), a personal computer (in which the reception unit PROD_C5 or the image processing unit C6 serves as a main supply source of the video), and a smartphone (in which the camera PROD_C3 or the reception unit PROD_C5 serves as a main supply source of the video).

Figure 9B:
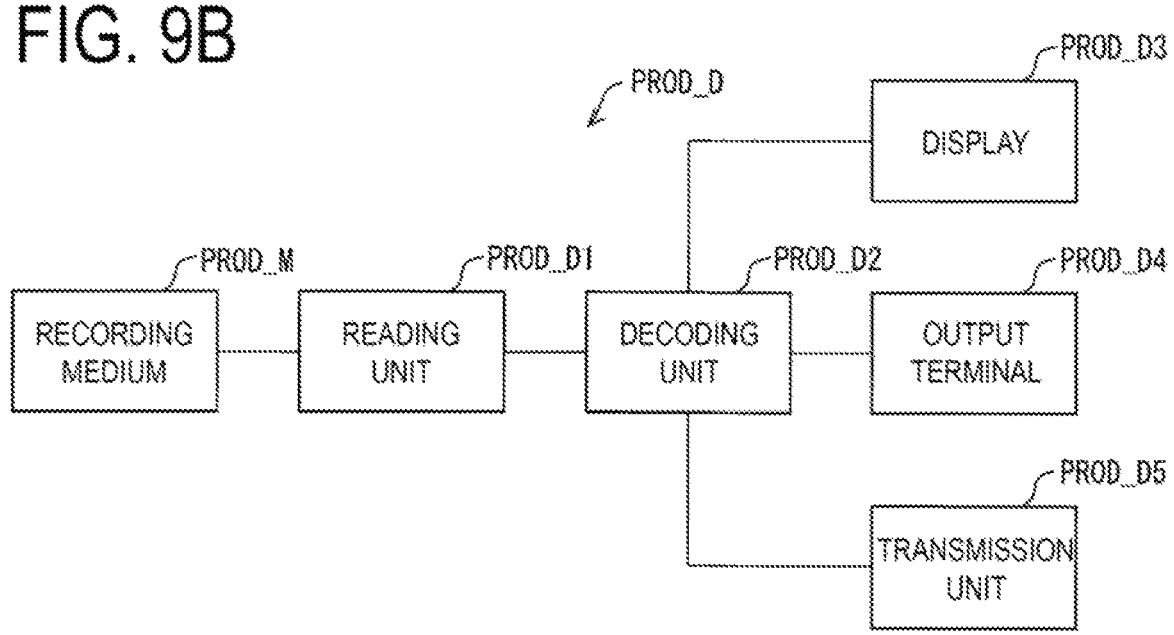

FIG. 9B is a block diagram illustrating a configuration of a reproducing device PROD_D mounted with the image decoding apparatus 31. As illustrated in FIG. 9B, the reproducing device PROD_D includes a reading unit PROD_D1 configured to read the coded data written in the recording medium PROD_M, and a decoding unit PROD_D2 configured to obtain the video by decoding the coded data read by the reading unit PROD_D1. The above-described image decoding apparatus 31 is utilized as the decoding unit PROD_D2.

Note that the recording medium PROD_M may be (1) a type of medium to be contained in the reproducing device PROD_D such as an HDD and an SSD, (2) a type of medium to be connected to the reproducing device PROD_D such as an SD memory card and a USB flash memory, and (3) a type of medium to be loaded in a drive device (not illustrated) contained in the reproducing device PROD_D such as a DVD and a BD.

The reproducing device PROD_D may further include a display PROD_D3 configured to display a video, as a supply target of the video output from the decoding unit PROD_D2, an output terminal PROD_D4 configured to output the video to the outside, and a transmission unit PROD_D5 configured to transmit the video. In FIG. 9B, a configuration where the reproducing device PROD_D includes all of these components is illustrated; however, some of these components may be omitted.

Note that the transmission unit PROD_D5 may be configured to transmit an uncoded video, and configured to transmit the coded data coded by a coding scheme for transmission different from a coding scheme for recording. In the latter, between the decoding unit PROD_D2 and the transmission unit PROD_D5, a coding unit (not illustrated) configured to code the video according to the coding scheme for transmission may be intervened.

Examples of such a reproducing device PROD_D include a DVD player, a BD player, and an HDD player (in which the output terminal PROD_D4 to which a television receiver or the like is connected serves as a main supply target of the video). Furthermore, examples of such a reproducing device PROD_D also include a television receiver (in which the display PROD_D3 serves as a main supply target of the video), a digital signage (also referred to as an electronic signboard, an electronic bulletin board, or the like, in which the display PROD_D3 or the transmission unit PROD_D5 serve as a main supply target of the video), a desktop PC (in which the output terminal PROD_D4 or the transmission unit PROD_D5 serves as a main supply target of the video), a laptop or tablet PC (in which the display PROD_D3 or the transmission unit PROD_D5 serves as a main supply target of the video), and a smartphone (in which the display PROD_D3 or the transmission unit PROD_D5 serves as a main supply source of the video).

Hardware-Wise Realization and Software-Wise Realization

Each block of the above-described image decoding apparatus 31 and image coding apparatus 11 may be realized hardware-wise by a logical circuit formed on an integrated circuit (IC chip), and may be realized software-wise by using a Central Processing Unit (CPU).

In the latter case, each of the above-described devices includes a recording device (recording medium) such as CPU configured to execute a command of a program for realizing each function, a Read Only Memory (ROM) where the program is stored, and a Random Access Memory (RAM) where the program is developed, a memory where the program and various types of data are stored. An object of the embodiments of the present invention can also be realized by supplying a recording medium where a program code of a control program of each of the above-described devices that is software for realizing the above-described functions (an executable program, an intermediate code program, and a source program) is recorded in a computer-readable manner, to each of the above-described devices, and reading and executing, by the computer (or a CPU or an MPU), the program code recorded in the recording medium.

Examples of the above-described recording medium to be employed include tapes such as a magnetic tape and a cassette tape, disks including a magnetic disk such as a floppy (registered trademark) disk/hard disk and an optical disk such as Compact Disc Read-Only Memory (CD-ROM), Magneto-Optical (MO) disc/Mini Disc (MD)/Digital Versatile Disc (DVD)/CD Recordable (CD-R)/Blu-ray Disc (registered trademark), cards such as an IC card (including a memory card)/an optical card, semiconductor memories such as a mask ROM/Erasable Programmable Read-Only Memory (EPROM)/Electrically Erasable and Programmable Read-Only Memory (EEPROM: registered trademark)/flash ROM, or logical circuits such as a Programmable logic device (PLD) and Field Programmable Gate Array (FPGA).

Furthermore, each of the above-described devices may be configured to be connectable to a communication network and the program code may be supplied via the communication network. The communication network may not be particularly limited as long as it is possible to transmit the program code. For example, the Internet, an intranet, an extranet, a Local Area Network (LAN), Integrated Services Digital Network (ISDN), Value-Added Network (VAN), a Community Antenna television/Cable Television (CATV) communication network, Virtual Private Network, a telephone line network, a mobile body communication network, a satellite communication network, and the like can be employed. Furthermore, a transmission medium included in the communication network is not limited to a medium of a particular configuration or type as long as the medium is capable of transmitting a program code. For example, a wired transmission medium such as Institute of Electrical and Electronic Engineers (IEEE) 1394, a USB, a power line transmission, a cable TV line, a telephone line, an Asymmetric Digital Subscriber Line (ADSL) may be used, and a radio transmission medium including an infrared transmission medium such as Infrared Data Association and a remote controller, BlueTooth (registered trademark), IEEE 802. 11 radio, High Data Rate (HDR), Near Field Communication (NFC), Digital Living Network Alliance (DLNA: registered trademark), a mobile telephone network, a satellite channel, and a terrestrial digital broadcasting network may be employed. The embodiments of the present invention may be implemented also in a form of computer data signal embedded in a carrier wave in which the program code is embodied by electronic transmission.

The embodiments of the present invention are not limited to the above-described embodiments, and various modifications may be possible within the scope defined by the claims. That is, an embodiment obtained by combining technical means appropriately modified within the scope defined by the claims may be also included in the technical range of the present invention.

CROSS-REFERENCE OF RELATED APPLICATION

This application claims the benefit of priority to JP 2016-190356 filed on Sep. 28, 2016, which is incorporated herein by reference in its entirety.

INDUSTRIAL APPLICABILITY

The embodiments of the present invention can be suitably applied to an image decoding apparatus configured to decode coded data in which image data is coded and an image coding apparatus configured to generate the coded data in which the image data is coded. Furthermore, the present invention may be suitably applied to a data structure of coded data generated by an image coding apparatus and referred to by an image decoding apparatus.

REFERENCE SIGNS LIST

11 Image coding apparatus
10 CT information decoding unit (constraint flag decoding unit, prediction-unit decoding unit)
20 CU decoding unit (prediction-unit decoding unit)
31 Image decoding apparatus

The invention claimed is:

1. An image decoding apparatus for decoding a picture, the image decoding apparatus comprising:
a CT information decoding circuitry that initializes a variable specifying whether to use a merge for a current coding tree; and
a CU decoding circuitry derives inter prediction information,
wherein
the CT information decoding circuitry sets a value of the variable equal to a first value, in a case that the value of the variable is equal to a second value and a size of a current coding block is less than a predetermined value,
in a case that the value of the variable is equal to the first value,
the CT information decoding circuitry sets a first location of a top left sample of a merge region equal to a second location of a top left sample of a target block and sets a first size of the merge region equal to a second size of the target block, and in the case that the value of the variable is equal to the first value,
the CU decoding circuitry shares the inter prediction information across blocks included in the merge region.

2. An image coding apparatus for coding a picture, comprising:
a CT information coding circuitry that initializes a variable specifying whether to use a merge for a current coding tree; and
a CU coding circuitry derives inter prediction information,
wherein the CT information coding circuitry sets a value of the variable equal to a first value, in a case that the value of the variable is equal to a second value and a size of a current coding block is less than a predetermined size,
in a case that the value of the variable is equal to the first value,
the CT information coding circuitry sets a first location of a top left sample of a merge region equal to a second location of a top left sample of a target block and sets a first size of the merge region equal to a second size of the target block, and in the case that the value of the variable is equal to the first value,
the CU coding circuitry shares the inter prediction information across blocks included in the merge region.

3. An image decoding method for decoding a picture, the image decoding method including:
initializing a variable specifying whether to use a merge for a current coding tree;
deriving inter prediction information;
setting a value of the variable equal to a first value, in a case that the value of the variable is equal to a second value and a size of a current coding block is less than a predetermined size;
setting a first location of a top left sample of a merge region equal to a second location of a top left sample of a target block, in a case that the value of the variable is equal to the first value;
setting a first size of the merge region equal to a second size of the target block, in the case that the value of the variable is equal to the first value; and
sharing the inter prediction information across blocks included in the merge region, in the case that the value of the variable is equal to the first value.

* * * * *